(12) United States Patent
Messick et al.

(10) Patent No.: US 10,254,808 B2
(45) Date of Patent: *Apr. 9, 2019

(54) SYSTEM AND METHOD FOR AGGRESSIVELY BUDGETTING POWER ALLOCATION FOR AN INFORMATION HANDLING SYSTEM USING REDUNDANT CONFIGURATION OF POWER SUPPLY UNITS

(71) Applicant: DELL PRODUCTS, L.P., Round Rock, TX (US)

(72) Inventors: Douglas E. Messick, Austin, TX (US); Kyle E. Cross, Austin, TX (US); John Erven Jenne, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/459,435

(22) Filed: Mar. 15, 2017

(65) Prior Publication Data
US 2017/0185124 A1 Jun. 29, 2017

Related U.S. Application Data

(63) Continuation of application No. 13/860,290, filed on Apr. 10, 2013, now Pat. No. 9,632,552.

(51) Int. Cl.
| | |
|---|---|
| *G06F 1/26* | (2006.01) |
| *G06F 1/32* | (2006.01) |
| *G06F 1/3206* | (2019.01) |
| *G06F 11/16* | (2006.01) |
| *G06F 1/3234* | (2019.01) |

(52) U.S. Cl.
CPC ............ *G06F 1/263* (2013.01); *G06F 1/3206* (2013.01); *G06F 1/3234* (2013.01); *G06F 11/16* (2013.01)

(58) Field of Classification Search
CPC ....... G06F 1/263; G06F 1/3206; G06F 1/3234
USPC ......................................... 713/300
See application file for complete search history.

(56) References Cited

U.S. PATENT DOCUMENTS

| | | | |
|---|---|---|---|
| 9,632,552 B2 * | 4/2017 | Messick | G06F 1/263 |
| 2008/0320322 A1 | 12/2008 | Green et al. | |
| 2009/0307512 A1 | 12/2009 | Munjal et al. | |

OTHER PUBLICATIONS

Chiappetta, Marco, How to pick the best PC power supply, Feb. 4, 2013, http:www.pcworld.com/article/2025425/how-to-pick-the-best-pc-power-supply.html, section titled "All about output".

* cited by examiner

*Primary Examiner* — Austin Hicks
(74) *Attorney, Agent, or Firm* — Isidore PLLC

(57) ABSTRACT

A method that budgets power allocation for an information handling system (IHS) includes: in response to determining that the IHS is to be powered by a redundant configuration of PSUs, budgeting a first amount of power that is less than a maximum power that can be utilized by the system, and configuring the system to autonomously utilize unused operating margin of the secondary PSU(s) in a redundant configuration of the PSUs during periods in which the system requires greater than the first amount of power; and in response to the information handling system not being powered by a redundant configuration of multiple PSUs, budgeting a second amount of power for the system that is at least equal to the maximum power that can be utilized by the system and is within the output of the primary PSU.

20 Claims, 10 Drawing Sheets

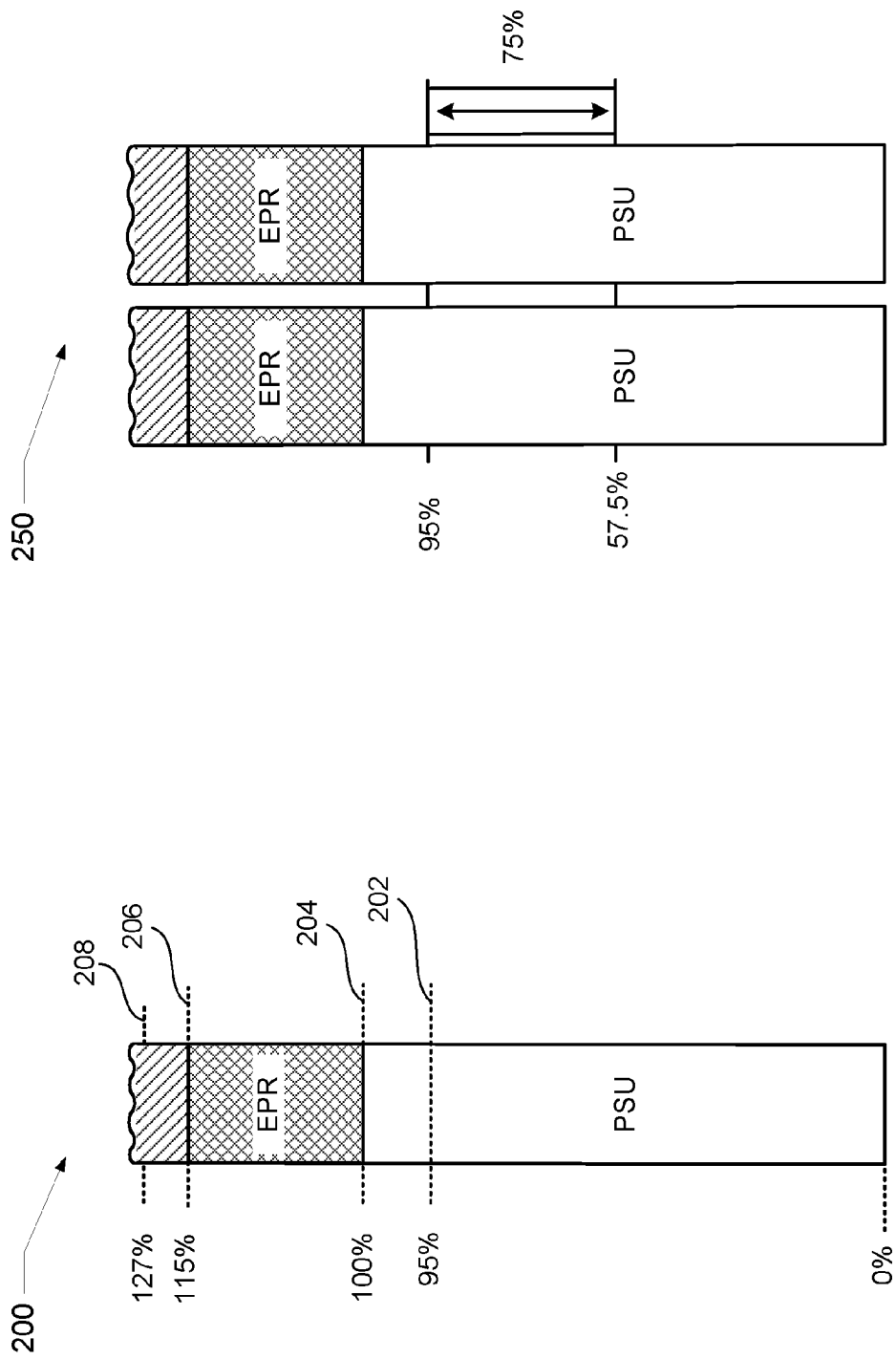

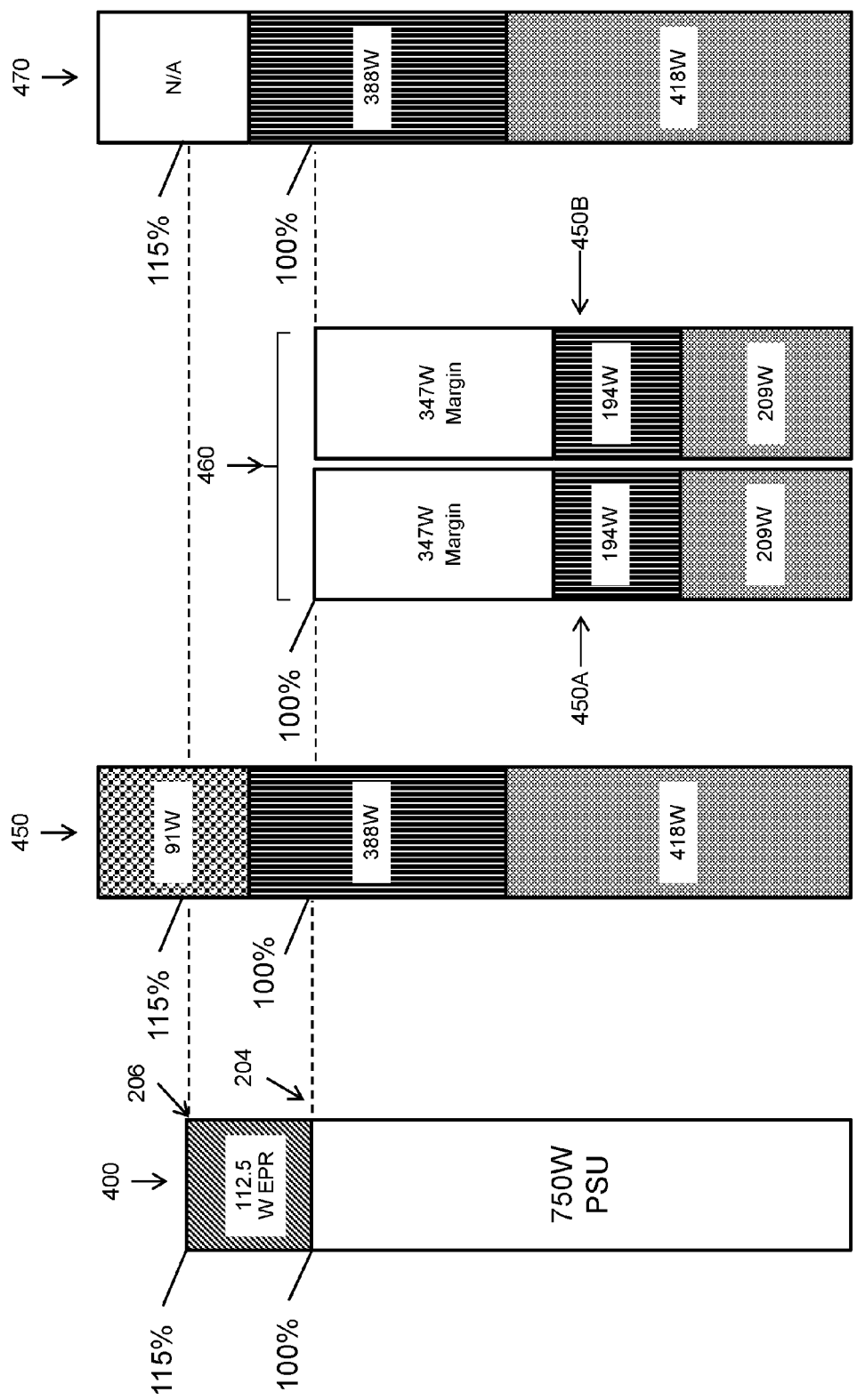

SYSTEM AND METHOD FOR AGGRESSIVELY BUDGETTING POWER ALLOCATION FOR AN INFORMATION HANDLING SYSTEM USING REDUNDANT CONFIGURATION OF POWER SUPPLY UNITS

RELATED APPLICATIONS

This application is a continuation of U.S. patent application Ser. No. 13/860,290, filed Apr. 10, 2013, the content of which is fully incorporated herein by reference.

BACKGROUND

1. Technical Field

The present disclosure generally relates to an information handling system and more particularly to a system and method of budgeting power allocation for information handling systems having a redundant configuration of power supply units.

The present disclosure generally relates to an information handling system and more particularly to a system and method of budgeting power allocation for information handling systems having a redundant configuration of power supply units.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

All information handling systems include at least one power supply unit (PSU). The PSU is used to power the main hardware components of the information handling systems. Hence, one factor in choosing a PSU for an information handling system is the system's hardware configuration. That is, to ensure that there is enough power available at all times to power the system, the PSU is chosen to satisfy a worst-case scenario where all the hardware components of the system are operating at peak performance. This, in reality, rarely happens.

Thus, there is a need for a system and method of choosing a PSU that accounts for expected everyday load (i.e., PSU right sizing) of an information handling system, without incurring the cost of over-budgeting based solely on maximum power usage.

BRIEF SUMMARY

Disclosed are computer-implementable methods, information handling systems, and computer readable storage device embodying program code for budgeting power allocation for a processing system. The methods, information handling systems, and computer program product make use of unused margins inherent in a redundant configuration of power supply units (PSUs) to provide a power budget that enables use of a PSU with a lower power rating than a maximum power used by the system and to increase PSU efficiency when configured with PSUs.

According to a first aspect, the computer-implementable method includes: determining whether the information handling system is to be powered by a redundant configuration of multiple power supply units (PSUs) in a redundant PSU configuration including a primary PSU and a secondary PSU; and in response to determining that the information handling system is to be powered by a redundant configuration of multiple PSUs, calculating a power budget, based on discovery of installed system components, of a first amount of power for the system that is less than a maximum power that can be utilized by the system, and configuring the system to autonomously utilize unused operating margin of the redundant configuration of the PSUs during periods in which the system requires greater than the first amount of power. Further, the method includes, in response to determining that the information handling system is not to be, or is no longer, powered by a redundant configuration of multiple PSUs, calculating a power budget, based on discovery of installed system components, of a second amount of power for the system that is at least equal to the maximum power that can be utilized by the system, and which does not exceed the output of the primary PSU.

According to the described embodiments, the primary PSU includes N PSUs, where N is an integer number greater than or equal to 1, and the N PSUs that comprise the primary PSU collectively provide the power necessary to support the IHS. Also, a secondary PSU of the redundant PSU configuration includes M PSUs that operate as backup PSUs to the primary PSU and which collectively provide additional redundant power capacity. Further, the redundant configuration of PSUs comprises N primary PSUs and M secondary PSUs in an N+M configuration.

In one or more embodiments, the first amount of power is the thermal design power (TDP) of the system supported by a single or primary PSU within the redundant configuration, and the second amount of power is at least equal to a highest value of power required to support a power envelope which includes power transients that can occur in the system and which is greater than the TDP of the system. The power transients are removed from direct consideration during power budgeting for the system when the information handling system is to be powered by a redundant PSU configuration.

In one or more embodiments, budgeting the first amount of power includes: determining a first sum of power consumed by all components within the system when operating in a sustained power consumption state; comparing the first sum of power to a maximum power output of a single or primary PSU; assigning the first sum of power as the budgeted first amount of power in response to the first sum of power being less than the power output of the single or primary PSU; Also, budgeting the second amount of power includes: determining a second maximum amount of power consumed by all components when operating in an enhanced power consumption state, where the enhanced power consumption state involves greater overall power consumption than the sustained power consumption state due to power transients; and setting the second amount of power budget to the second maximum amount of power. In one or more embodiments, a non-transient portion of the second amount of power that is less than the maximum output provided by a single or primary PSU, and the power transients are supported by one or more of additional power capacity provided within the single or primary PSU, power capacity of an internal battery backup, and power capacity of a universal power supply.

In yet another embodiment, determining the first total amount of power includes: adding each individual amount of power consumable by each hardware component during normal operation of the hardware components within the system to generate the first total amount of power. Also, determining the second maximum amount of power includes: identifying which components are capable of intermittently operating in enhanced operating states in which the component consumes additional amounts of power above a normal consumption for the particular component, where the additional amounts of power yield detectable power transients; adding together each of the detectable power transients for all components in the system to yield a total power transient; and adding the total power transient to the first total amount of power to yield the second maximum amount of power.

In one or more embodiments, at least one component of the system intermittently consumes additional amounts of power above a sustained power consumption for that component to intermittently generate power transients above a thermal design power (TDP) of the system. Then, the second amount of power includes a power allocation that is sufficient to support periods in which the power transients are generated within the system.

While the information handling system is being powered by the redundant configuration of two or more PSUs with the first amount of power budgeted for the system, additional aspects of the method includes: monitoring system power usage within the information handling system; detecting when at least one component is operating in a state that generates power transients, which causes the system to consume greater than the first amount of power budgeted; and in response to a total amount of current system power required being above the first amount of power budgeted, automatically allocating unused operating margins of reserve power from the redundant configuration of the PSUs in order to support system operation within a power envelope that accounts for the power transients. With this aspect, in one or more embodiments, the at least one component includes a central processing unit (CPU), which operates in one of (a) a first CPU state in which the processor consumes a first amount of CPU power that is supported within a power envelope corresponding to the first amount of system power and (b) a second enhanced CPU state in which the processor consumes a second amount of CPU power that requires a larger power envelope corresponding to the second amount of system power.

A second aspect of the disclosure provides an information handling system, which includes: at least one processor that executes program code; and a power controller communicatively coupled to the at least one processor and to other components within the information handling system and which includes firmware that executes on a microprocessor of the power controller to configure the power controller to perform the above-presented functions and processes. A third aspect of the disclosure provides a computer readable storage device embodying program code that when executed performs or causes a machine to perform the above-presented functions and processes.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2 displays usage characteristics of an exemplary single power supply unit (PSU), according to one or more embodiments;

FIG. 3 depicts usage characteristics of a redundant PSU configuration with two equally rated PSUs, in accordance with one or more embodiments;

FIG. 4A depicts available power of a 750 W PSU that may be used to power an IHS according to an embodiment;

FIG. 4B illustrates an example power budget for an IHS with allocation for the rest of system (ROS), sustained power for a processor (TDP), and enhanced processing state for the processor that primarily consists of power transients, where the power budget exceeds the output capabilities of the single or primary PSU illustrated in FIG. 4A, according to one embodiment;

FIG. 4C illustrates the same example power budget for an IHS as depicted in FIG. 4B, where the IHS is configured with two PSUs, as illustrated in FIG. 4A, according to one embodiment;

FIG. 4D illustrates an example power budget for an HIS, which power budget does not exceed the output of a single or primary PSU when the enhanced operating state of the central processing unit (CPU) is reduced or disabled from the example power budget from FIG. 4B, in accordance with one embodiment;

DETAILED DESCRIPTION

Figure 1:
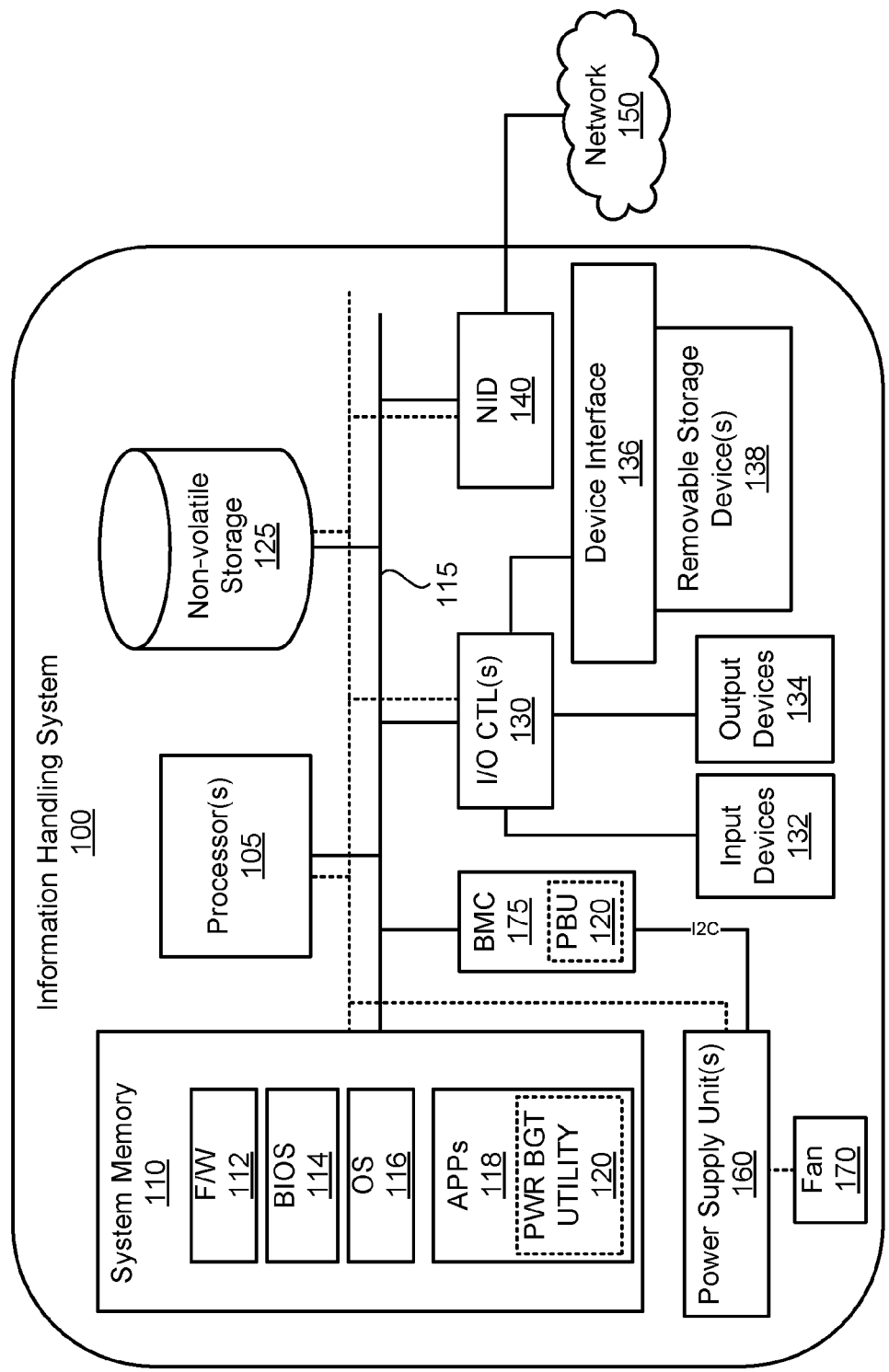
FIG. 1 illustrates an exemplary information handling system (IHS) within which various aspects of the disclosure can be implemented, according to one or more embodiments.

The present disclosure generally provides computer-implementable methods, information handling systems, and power subsystems that make use of unused margins inherent in a redundant configuration of power supply units (PSUs) to provide a power budget that enables use of a PSU with a lower power rating than a maximum power used by the system and to limit system power consumption when PSU redundancy. The methods, information handling systems, and power subsystems further reduces maximum system power usage/consumption by suspending the power state that allows for power transients in response to detection of an impending PSU failure and/or before a power transient can occur in order to avoid system shut down. Two different innovations are presented within the present disclosure. The disclosure presents most of the hardware aspects (FIGS. 1-7) as general aspects of the disclosure, and then presents specific aspects of the two different innovations in separate methods (FIGS. 8-12).

According to a first aspect, embodiments of the disclosure present an information handling system power budgeting system and a computer-implementable method of budgeting power allocation for powering an information handling system. The method includes: determining whether the IHS is to be powered by a redundant configuration of multiple power supply units (PSUs); in response to determining that the IHS is to be powered by a redundant configuration of multiple PSUs, budgeting a first amount of power for the system that is less than a maximum power that can be utilized by the system, but exceeds the output of the primary PSU, and configuring the system to autonomously utilize unused operating margin of the redundant configuration of the PSUs during periods in which the system requires greater than the first amount of power; and in response to the information handling system not being powered by a redundant configuration of multiple PSUs, budgeting a second amount of power for the system that is at least equal to the maximum power that can be utilized by the system, and which does not exceed the output of the primary PSU.

According to a second aspect, the disclosure presents a power controller of an information handling system that controls power allocation for an information handling system with components that can intermittently exhibit power transients. The power controller is configured to: identify an enhanced power state during which a maximum power required by the information handling system is greater than the amount of power provided by a single or primary PSU of a redundant configuration of PSUs; and allocate a portion of the unused operating margin of backup reserve power to support intermittent power transients that can occur during system operation in the enhanced power state. The power controller is further configured to, in response to a detection of a condition that reduces an amount of unused operating margin of backup reserve power to less than an amount of additional power required to support the intermittent power transients, autonomously limit, reduce or disable the enhanced power state to prevent an occurrence of the intermittent power transients above the currently available maximum power.

In the following detailed description of exemplary embodiments of the disclosure, specific embodiments in which the disclosure may be practiced are described in sufficient detail to enable those skilled in the art to practice the disclosed embodiments. For example, specific details such as specific method orders, structures, elements, and connections are presented herein. However, it is to be understood that the specific details presented need not be utilized to practice the embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

With reference now to the figures wherein like reference numbers denote like parts, FIG. 1 illustrates a block diagram representation of an exemplary information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, exemplary IHS 100 includes one or more processor(s) 105 coupled to a system memory 110 via system interconnect 115. System interconnect 115 can be interchangeably referred to as a system bus in one or more embodiments. System memory 110 can include therein a plurality of software and/or firmware modules including firmware (F/W) 112, basic input/output system (BIOS) 114, operating system (O/S) 116, and application(s) 118, which includes power budgeting utility 120, in the illustrative embodiment. The one or more software and/or firmware modules within system memory 110 can be loaded into processor(s) 105 during operation of IHS 100. Specifically, as utilized herein, power budgeting utility 120 can execute on processor(s) 105 to cause processor 105 to perform several processes included in the power budgeting analysis, including, but not limited to: performing system polling for power ratings of components within IRS 100, calculating various power values, including maximum power (PMax), thermal design power (TDP), maximum power transients, and others; and determining an aggressive power budget based on the calculations. In a specific embodiment, executable code of power budgeting utility 120 causes processor(s) 105 to perform several of the functions illustrated by the flow chart of FIG. 8, which is later described.

In an alternate embodiment, power budgeting utility (PBU) 120 can be firmware located within baseband management controller (BMC) 175, which is communicatively connected to power supply unit(s) 160, described hereafter. BMC 175 includes an embedded controller or processor and provides several management functions of the system. Power budgeting utility 120 is shown with dashed lines in both system memory 110 and BMC 175 to indicate that the location is optional and based on specific implementation and/or configuration of the IHS 100.

IHS 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device, a camera, a microphone, or audio speaker(s) (not shown). Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. Device interfaces 136 can further include General Purpose I/O interfaces such as $I^2C$, SMBus, and peripheral component interconnect (PCI) buses.

IHS 100 comprises a network interface device (NID) 140. NID 140 enables IHS 100 to communicate and/or interface with other devices, services, and components that are located externally to IHS 100. These devices, services, and components can interface with IHS 100 via an external network, such as exemplary network 150, using one or more communication protocols. Network 150 can be a local area network, wide area network, personal area network, and the like, and the connection to and/or between network 150 and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

IHS 100 further includes one or more power supply unit(s) (PSU) 160. PSU 160 is further illustrated connected to BMC 175 via an Inter-Integrated Circuit ($I^2C$) bus. BMC 175 enables remote operation control of PSU 160 and other components within IHS 100. PSU 160 powers the hardware components of IHS 100 (i.e., processor(s) 105, system memory 110, nonvolatile storage 125, NID 140, I/O CTL(s) 130 etc.) via a power supply system, generally illustrated by the dashed connecting lines. When powered, these hardware components dissipate heat and thus have to be cooled to prevent the component from exceeding its maximum operating temperature range. For example, processor(s) 105 may occasionally draw an excessive amount of power from PSU(s) 160 during high frequency operations and/or high volume processing. Processor(s) 105 would then need to be cooled down so that the system can remain within a designed thermal envelope. To assist with maintaining the temperatures within the desired thermal envelope, an active cooling system, such as fan 170 can be utilized. As illustrated, PSU 160 also powers the fan 170. Note that since the processor(s) 105 may dissipate an excessive amount of heat at times, the processor(s) 105 may have a dedicated cooling system apart from and in addition to the system's cooling system.

Those of ordinary skill in the art will appreciate that the hardware components and basic configuration depicted in FIG. 1 and other figures described herein may vary. Thus, the illustrative components within these figures are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Generally, PSUs, such as PSU 160, are designed to provide thermal design power (TDP) to an information handling system. TDP is the maximum amount of power that the information handling system's cooling system is designed to handle. Thus, TDP is not the most power the information handling system could ever draw, but rather the maximum power that the information handling system will draw when running normal every day applications. Thus during normal operation, the information handling system draws a maximum amount of power equal to the TDP, which is a bit less than the maximum available power (PMax) that can be supported by the PSUs, for overheating and other considerations. FIG. 2, described below illustrates this power supply configuration. Likewise, the processor(s) 105 has a CPU (central processing unit) TDP which is the maximum amount of power that the processor's dedicated cooling system is designed to handle. Exceeding either the system TDP or the CPU TDP may require that corrective actions be taken to ensure that the system remain within the designed thermal envelope.

For example, when either the processor(s) 105 or the IHS 100 as a whole consumes more power than TDP, special processor circuitries may be activated to add idle cycles and/or to reduce processor frequency (i.e., processor throttling) and/or other hardware components may be throttled with the intention of reducing the amount of consumed power and/or dissipated heat. If power consumption continues to increase despite the processor and/or the other hardware components throttling, a thermal point may be reached at which a feature called "over current protection" (OCP) is activated. When activated, OCP will shut down the information handling system.

In certain instances the information handling system may draw more than one-hundred percent (100%) of PSU power capacity. For example, due to a spike in processing demands, the processor may draw a greater than normal amount of power, causing the information handling system to draw more power than the PSUs power capacity. It is understood by those generally skilled in the art that PSUs can provide greater power than the 100% rating. It is also understood by those generally skilled in the art that a PSU cannot continually operate above a certain limit for an extended period of time before entering a failure mode, exceeding thermal limits, and/or invoking a method of PSU self-protection. The range used as an example for this disclosure is labeled Extended Power Range (EPR), and the example numbers used are 100%-115% of the PSUs maximum output rating. Also, the PSU self-protection limit used as an example value for this disclosure is 127% of the PSUs maximum output rating, and is given the name Over Current Protection (OCP).

Because of the limitations with a single or primary PSU implementation, one design aspect recognizes the importance of budgeting the overall maximum amount of power that can be consumed during these periods of enhanced power operations. The power budget of an IHS with a single or primary PSU implementation must therefore be calculated to include consideration of all such power transients that can occur within the system. EPR allows richer system configurations to be supported with smaller PSUs.

FIG. 2 displays a PSU 160 designed to support EPR. The PSU 160 has a full capacity of one-hundred percent TDP (100%) 204. The PSU 160 is designed to provide sustained power, or thermal designed power (TDP), to an IHS 100 up to the PSU 160 rated output capacity of 100% TDP 204. The IHS 100 is designed to implement power control mechanisms (i.e. throttling) when the PSU(s) operate at or above 95% TDP 202 of the PSUs rated output capacity. The PSU 160 has a maximum EPR 206 set at one-hundred-fifteen percent (115%) of the PSU capacity. At one-hundred-twenty-seven percent (127%) of the PSU capacity, OCP 208 will be reached and the IHS 100 will go through a shutdown procedure.

To provide fail safe power to an IHS 100, redundant PSU configurations may be used. In a redundant configuration, two equally power-rated PSUs may be used such that when one PSU fails, the other PSU can assume control and continue servicing the information handling system without interruption. FIG. 3 depicts a redundant configuration where two equally power-rated single or primary PSUs 160 are used. Generally, PSUs in a redundant configuration are set for load sharing. In cases of load sharing, only one half (or 50%) from each PSU 160 is used to provide TDP power to IHS 100. Likewise, each PSU 160 only provides one half of the max EPR 206 of 115% (or 57.5%). One aspect of the disclosure is the recognition that in this redundant configuration, the two PSUs 160 can each operate at one-hundred percent (100%) TDP 204 for a combined two-hundred percent (200%). Thus, the two PSUs 160 can easily supply power greater than the max EPR value of 115%. Practically, the two combined PSUs 160 in a redundant PSU configuration have a minimum margin of seventy-five percent (75%) that may never be used (i.e., 190% (2×95% of the combined un-inhibited PSU output)−115% (max EPR) =75%).

Throughout the disclosure, reference is made to a first PSU and a second PSU, either of which can be a primary PSU. However, to simplify the description herein, the first PSU is described as being a primary PSU and the second PSU is described as being a secondary PSU. According to the described embodiments, the primary PSU includes N PSUs, where N is an integer number greater than or equal to 1, and the N PSUs that comprise the primary PSU collectively provide the power necessary to support the IHS. Also, a secondary PSU of the redundant PSU configuration includes M PSUs that operate as backup PSUs to the primary PSU and which collectively provide additional redundant power capacity. Further, the redundant configuration of PSUs comprises N primary PSUs and M secondary PSUs in an N+M configuration (e.g., 1+1, 2+2, 3+1, etc.).

In the descriptions which follow, specific reference is made to processor performance and operation in a normal mode as well as in an enhanced mode, and specifically to processor operation in an enhanced processing mode or system operation in an enhanced processing state. The specific references to processor operation is for example only, as the described features can generally be applied to other components within the IHS 100 that can operate in a first mode or state in which the component consumes a first amount of power, i.e., sustained power consumption, and/or a second mode or state in which the component consumes a second, larger amount of power, i.e., enhanced power consumption. With the operation in the enhanced processing mode, additional amounts of power are required above the maximum amount of power that can be provided by a single or primary PSU. The case can occur where the first amount of power can be supported by the capabilities of a single or primary PSU, but the second larger amount of power can exceed the capabilities of a single or primary PSU. It is appreciated that the features and functionality described herein with respect to power budgeting and the novel system-level power response methodology and/or mechanisms are not limited to the singular processor-based implementation. As described further herein, the system-level power response methodology and/or mechanism involves de-activating or limiting of enhanced operating modes in response to a specific series of detected conditions while the system's power budget envelope is configured around a redundant PSU configuration with access to excess power margins. The features and functionality can be equally extended to any of the various other components of the IHS 100 that (1) consume power within the TDP of the component and/or the system, and (2) intermittently operate in an enhanced mode producing power transients above the TDP of the system. Thus, specific reference to the processor implementation and the enhanced processing mode and associated features are not intended to limit the scope of the disclosure, but rather present a specific embodiment for clarity.

Presently, there is a new line of processors (e.g., third generation Intel® Core™ processors) that is being used in information handling systems, such as IHS 100. These new processors include an enhanced processing feature. The enhanced processing feature allows the processors to run faster than base operating frequencies if the processors are operating below power, current, and temperature specification limits. When the processors are operating below these limits and workload demands additional performance, the processors' frequency will dynamically increase until the upper limit of frequency is reached. The increase occurs in increments of 100 MHz or 133 MHz (depending on the processors), as required to meet the demand. When any of the electrical or thermal limits are reached, the operating frequency automatically decreases in decrements of 100 MHz or 133 MHz until the processors are again operating at TDP.

According to one embodiment, processor performance states (P-states) define operating frequencies and voltages of a processor. The number of P-states is processor specific. Higher P-state numbers represent slower processor speeds. Thus, power consumption is lower at higher P-states. Processors with an enhanced processing feature have a P0 state. In order for the enhanced processing feature to be activated, the information handling system and specifically the budgeted power envelope must support a P0 state and specifically the inherent power transients that occur during processor operation in the P0 state (i.e., the enhanced operating mode or the enhanced processing mode).

Thus, with the enhanced processing mode, the power envelope of the processors is being redefined to allow short excursions above CPU TDP. For example, a power level can be defined where a processor can draw power up to a higher percentage of CPU TDP for seconds, e.g., up to 120%. Further, due to inclusion of multiple CPU cores in the IHS, transition between low and high power instruction processing, may occur up to a maximum CPU power for milliseconds. The disclosure extends this capability of enhanced operation to account for additional components that may similarly allow peak power levels for significant periods of time while maintaining TDP power over longer time averages to allow for higher performance levels.

As introduced above, the actual power that the processor consumes may be more than TDP. Within the disclosure, the additional amount of power above TDP that is being consumed by the processor will be referred to as power transients. The processor operates within CPU TDP during normal operating mode and then operates within a power envelope extending up to a maximum CPU power for some periods of enhanced operating state in which the power transients are generated.

Since processor power consumption in the enhanced mode can reach the maximum CPU power even for milliseconds at a time, PSU overload may result. Thus, according to one aspect of the disclosure, budgeting CPU power to a number less than the maximum CPU power when operating within a single or primary PSU configuration requires implementation of a feature to prevent enhanced processing power transients from exceeding the budgeted CPU power in order to prevent invoking PSU hardware protection and potentially shut down the system. For example, if CPU TDP is 115 W and maximum CPU power is 180 W, then a CPU power budget allocation of an extra 65 W over CPU TDP (i.e., 180 W−115 W=65 W) is needed to eliminate or reduce the likelihood of a system shutdown. In a two-processor core system, an extra 130 W must be budgeted for the power transients generated during the enhanced processing state. One aspect of the disclosure involves a recognition that having to provision for this much extra power, that may only sometimes be used, can greatly increases PSU power budgets, and can require the use of PSU(s) with greater power output capabilities that can impact system cost and power efficiency. As one component of the solution to this problem, the disclosure provides for use of a redundant PSU configuration and then reconfiguring the manner in which the redundant power supply is utilized to account for the enhanced operating modes, and reduce the need to require the use of a PSU(s) with greater power output capabilities.

According to one aspect of the disclosure, the unused operating margins inherent with redundant PSU configurations (e.g., the unused 75% margin described above) are utilized to accommodate CPU power transients that are above CPU power budgets. This usage of the unused margins also comes with a caveat that the CPU power transients associated with a processor operation in an enhanced processing mode may need to be de-activated as necessary, to prevent system over-consumption of power in certain fault/failure conditions. With these two concepts firmly embedded, the disclosure enables aggressive power budgeting techniques that provide a system power budget that incorporates a CPU power budget of less than the maximum CPU power with redundant PSU configurations of the power supply unit(s) 160. According to one aspect of the disclosure, when a fault causes PSU redundancy to be lost, the processor may dynamically be reconfigured during run-time to prevent enhanced processing power transients from occurring.

FIG. 4A depicts a single 750 W PSU 400 that may be used to power an IHS 100. The 750 W PSU 400 accordingly produces 750 W at full capacity TDP 204 supporting a maximum IHS power budget of 115% of 862.5 W at max EPR 206 (i.e., 115% of 750 W). FIG. 4B illustrates a breakdown of a power budget calculation for the example IHS 100, which has a processor with an enhanced processing mode. As shown by FIG. 4B, using the TDP as the power allocation for the normal operating state, the calculated power budget is as follows: 418 W for all hardware components, except the processor(s), 388 W for the processor(s) sustained power or TDP and 91 W for enhanced processing power transients. This provides a total maximum power required of 897 W. As mentioned above, the 750 W PSU 400 in FIG. 4A can only support an IHS with a power budget up to 862.5 W. Consequently, a single 750 W PSU 400 will not have adequate power to service the IHS 100. Put differently, using a single 750 W PSU 160 to power such an IHS 100 may lead to system shutdowns each time the system enters the enhanced operating mode. Thus, with a single or primary PSU implementation, the power budget calculation results in a PSU that provides a maximum power of at least 897 W, or rounded up to a 900 W PSU.

However, given the increasing use of redundant PSU configurations, primarily for system reliability and elimination in system downtime caused during single or primary PSU failures, one aspect of the disclosure involves the recognition that two 750 W PSUs 106 in a redundant configuration can be controlled to provide more than adequate power to the IHS 100, without increasing the power rating of the individual single or primary PSUs. FIG. 4C depicts a power budget for the IHS 100 serviced by two single or primary PSUs 450A-B operating in a redundant PSU configuration 460. As described above, in this redundant configuration, each PSU 450 will provide half the needed power to the different hardware components. Thus, each PSU 450 will provide 209 W to all the components, excluding the processor(s), and 194 W to the processor(s) for a total of 403 W out of 750 W. Thus, there will be 347 W of unused or unallocated power still available from each of the 750 W PSUs 450. Hence, the total 91 W needed for the enhanced processing power transients can easily be accommodated by the minimum combined margin of 75% of a single or primary PSU of 562.5 W, and in this example power budget there is 694 W of combined margin (2×347 W or 92.5% of a single 750 W PSU.)

Figure 5:
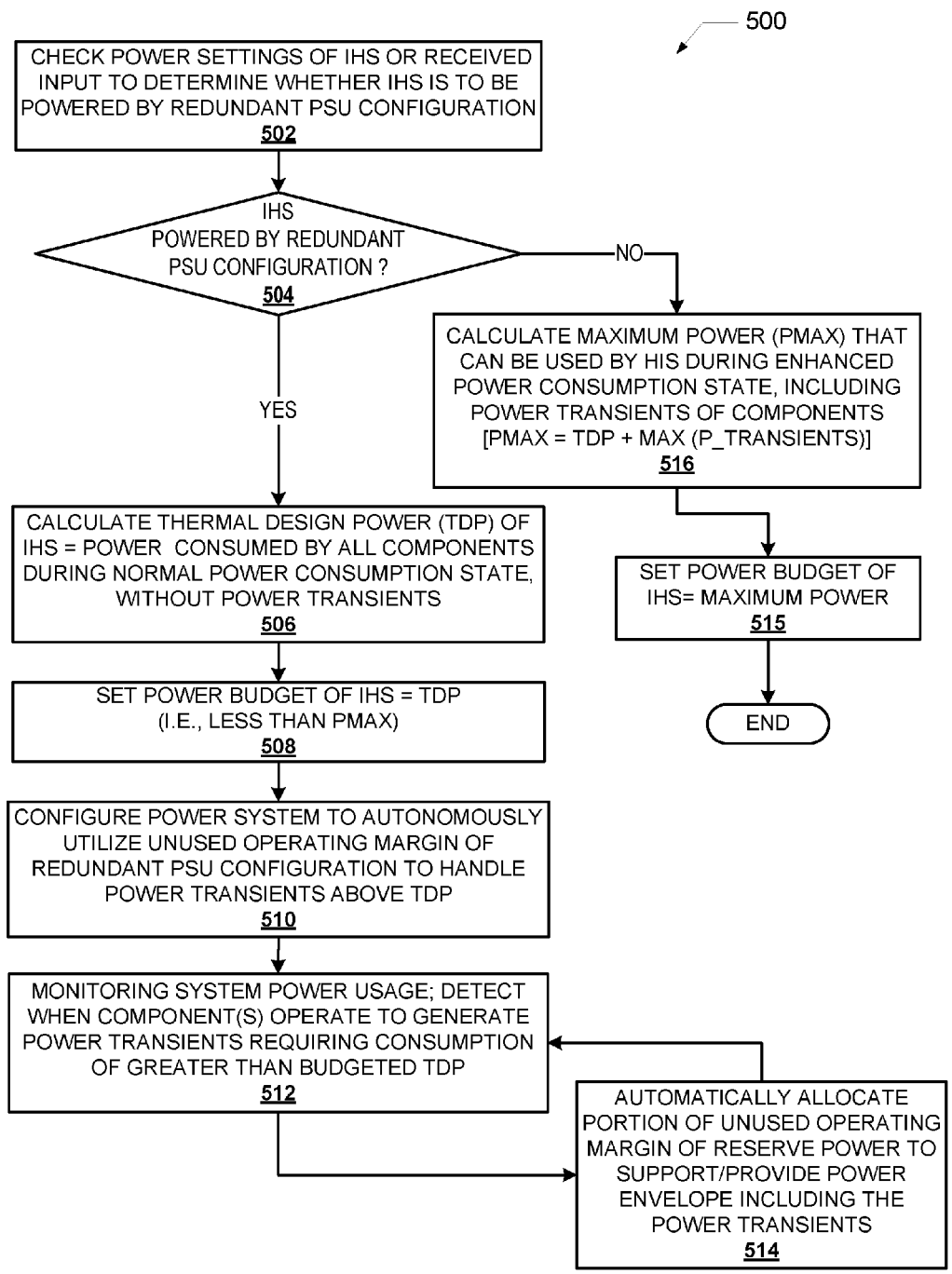
FIG. 5 is a flowchart of a method determines an efficient allocation of a power budget for an IHS having components that generate power transients above a normal consumption power state, according to one embodiment.

Referring now to the flow charts and in particular to FIG. 5, there is illustrated a method 500 by which aggressive power budgeting can be implemented within an IHS having a plurality of PSUs. Aspects of the method are provided by execution on processor 105 of power budgeting utility 120, and the method can be described from the perspective of the processor 105 and/or the IHS 100. Method 500 begins at block 502 with processor 105 determining whether the information handling system is to be powered by a redundant configuration of multiple power supply units (PSUs). In one embodiment, the determination is based on one of (a) actual power settings of the power subsystem of the IHS or (b) user provided input indicating the configuration to be set. In response to determining at decision block 504 that the information handling system is to be powered by a redundant configuration of multiple PSUs, method 500 includes budgeting of a first amount of power for the system that is less than a maximum power that can be utilized by the system. Specifically, method 500 provides determining a first total amount of power consumed by all components within the system when operating in a sustained power consumption state (i.e., without accounting for power transients) (block 506). In one embodiment, determining the first total amount of power includes: adding each individual amount of power consumable by each hardware component during normal operation of the hardware components within the system to generate the first total amount of power. Once the first amount of power is determined or calculated, at block 508, method 500 includes setting the power budget of the IHS 100 to be equal to the TDP, which is less than the maximum power consumable by the IHS, particularly during operation in the enhanced power mode. Method 500 also includes configuring the system to autonomously utilize unused operating margin of the redundant configuration of the PSUs during periods in which the system requires greater than the first amount of power (block 510).

It is appreciated that while the disclosure provides the TDP as the assigned power budget for normal system operation, the use of TDP is solely to provide a concrete example. Other values can be assigned that are higher or lower than the TDP, in alternate embodiments, and the use herein of TDP is not intended to be limiting on the scope of the disclosure.

Further, while the information handling system is being powered by the redundant configuration of two or more PSUs with the first amount of power budgeted for the system, additional aspects of the method 500 include: monitoring system power usage within the information handling system (block 512); detecting when at least one component is operating in a state that generates power transients, which causes the system to consume greater than the first amount of power budgeted (block 512); and in response to a total amount of current system power required being above the first amount of power budgeted, automatically allocating unused operating margins of reserve power from the redundant configuration of the PSUs in order to support system operation within a power envelope that accounts for the power transients (block 514).

Returning to decision block 504, in response to determining that the information handling system is not to be powered by a redundant configuration of multiple PSUs, method 500 provides budgeting of an amount of power for the system that is at least equal to the maximum power that can be utilized by the system. Specifically, at block 516, method 500 includes calculating and/or determining a maximum amount of power consumed by all components of the IHS 100 when operating in an enhanced power consumption state, where the enhanced power consumption state involves greater overall power consumption than the sustained power consumption state due to power transients. As one component of this process of determining and/or calculating the second maximum amount of power, method 500 can include: identifying which components are capable of intermittently operating in enhanced operating states in which the component consumes additional amounts of power above a normal consumption for the particular component, where the additional amounts of power yield detectable power transients; adding together each of the detectable power transients for all components in the system to yield a total power transient; and adding the total power transient to the first total amount of power to yield the second maximum amount of power. In one or more embodiments, at least one component of the system intermittently consumes additional amounts of power above a sustained power consumption for that component to intermittently generate power transients above a thermal design power (TDP) of the system. Then, the second amount of power includes a power allocation that is sufficient to support periods in which the power transients are generated within the system. Then, method 500 includes setting the power budget of the IHS to at least as great as the calculated maximum amount of power (block 515). The process ends at end block.

In one or more embodiments, budgeting the first amount of power includes: determining a first sum of power consumed by all components within the system when operating in a sustained power consumption state; comparing the first sum of power to a maximum power output of a single or primary PSU; assigning the first sum of power as the budgeted first amount of power in response to the first sum of power being less than the power output of the single or primary PSU. Also, budgeting the second amount of power includes: determining a second maximum amount of power consumed by all components when operating in an enhanced power consumption state, where the enhanced power consumption state involves greater overall power consumption than the sustained power consumption state due to power transients; and setting the second amount of power budget to the second maximum amount of power. In one or more embodiments, a non-transient portion of the second amount of power is less than the maximum output provided by a single or primary PSU, and the power transients are supported by one or more of additional power capacity provided within the single or primary PSU, power capacity of an internal battery backup, and power capacity of a universal power supply.

Thus, in the above described embodiment, the first amount of power is the thermal design power (TDP) of the system that does not exceed the output of the primary PSU within the redundant configuration. The power transients are removed from direct consideration during PSU right sizing for the system when the information handling system is to be powered by a redundant PSU configuration. Also, the second amount of power is at least equal to a highest value of power required to support a power envelope which includes power transients that can occur in the system and which is greater than the TDP of the system. A maximum value of the power transients is included in a calculation for PSU right sizing during power budgeting for the system when the information handling system is to be powered by a single or primary PSU. Given that the second amount of power is greater than the first amount of power, this power delta can drive the need to utilize PSUs with greater output capabilities when budgeting non-redundant PSUs to a second amount of power than the needed output capabilities of redundant PSUs when budgeted to the first amount of power.

The below equations provide example calculations for determining the PSU right sizing for a single or primary PSU, based on whether the system is to be powered by a redundant PSU configuration or a single or primary PSU.

Redundant 1+1: 1×PSU<$1^{st}$ amount of power budget<=Max IHS power (i)

Non-Redundant 1+0: 1×PSU>$2^{nd}$ amount of power budget>=Max IHS power (ii)

In one or more embodiments, the at least one component includes a central processing unit (CPU), which operates in one of (a) a first CPU state in which the processor consumes a first amount of CPU power that is supported within a power envelope corresponding to the first amount of system power and (b) a second enhanced CPU state in which the processor consumes a second amount of CPU power that requires a larger power envelope corresponding to the second amount of system power.

When operating with this redundant configuration, if one PSU 160 should become inoperative and enhanced processing mode is not deactivated or limited, as explained in the case of the single or primary PSU 160 above, the remaining PSU 160 will not have enough power to adequately service the IHS 100. FIG. 4B again illustrates a power budget of an IHS 100 with enhanced processing processor capabilities and which includes a single or primary PSU 160. In such a case, if the enhanced processing mode of the processor is disabled, the lone PSU 160 will not need to provide the extra 91 W required by the enhanced processing power transients. Hence, only 806 W will be needed as illustrated in FIG. 4D. As noted above, a PSU can provide up to a max EPR 206, which in this case is 862.5 W, a value well above the 806 W needed to provide power to all the hardware components, including the processor, in the IHS 100, when the components are operating in normal mode (i.e., not in an enhanced mode).

Figure 6:
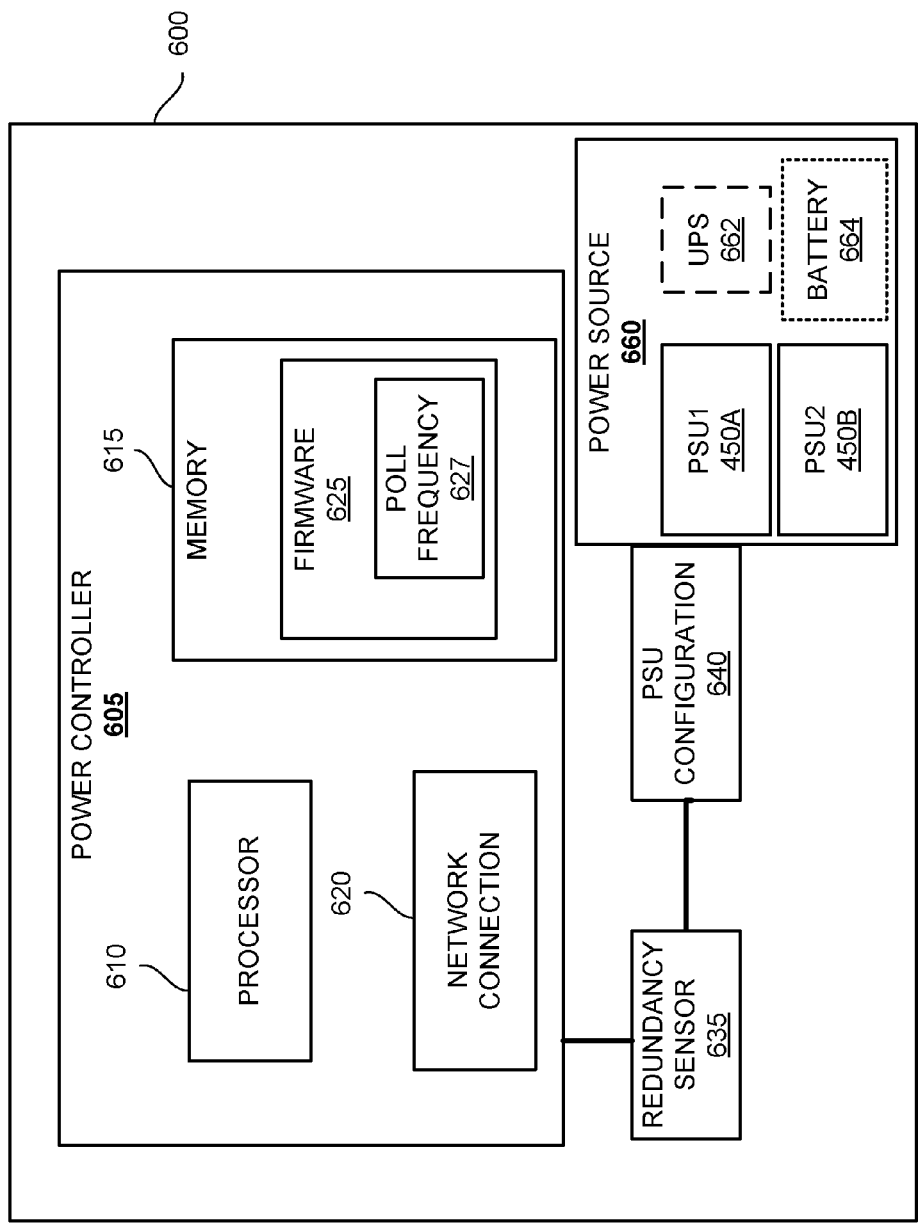
FIG. 6 illustrates an example Remote Access Controller (RAC) utilized to control power allocations for an IHS that supports components that generate power transients, in accordance with one or more embodiments.

To accommodate those instances where either (i) the TDP is utilized for the power budget with system that provide power transients above the TDP or (ii) the system's power available supply is not sufficient to support the enhanced power mode requirements for power consumption, a control mechanism is required that is configured specifically to support these different scenarios. FIG. 6 illustrates an exemplary power subsystem 600 utilized within IHS 100. Power subsystem 600 can be located on a planar or motherboard of an IHS 100. Power subsystem 600 includes a power source 660 and power controller 605. Power source 660 can be one or more batteries or power supply units. For purposes of the description, power source 660 is referred to as containing: (i) a single power supply unit, which encompasses non-redundant configurations of multiple power supply units, or (ii) multiple PSUs configured to operate in a redundant PSU configuration. The power source 660 provides the electrical power for operation of the power controller 605 and all other components of the IHS 100. Further, in one embodiment, the power controller 605 may continue to draw auxiliary power from the power source 660 of the IHS 100 even when the IHS 100 is in a power off state. In one embodiment, power controller 605 is a Remote Access Controller (RAC), which can be integrated on the motherboard or chassis of IHS 100. In one embodiment, where the power controller 605 is an integrated RAC (iRAC), the iRAC supports out-of-band management facilities, which provides a dedicated management channel for device maintenance. With this implementation, embedded management and power management operations can all be performed remotely through a supported web browser via the iRAC.

The power controller 605 may include an embedded processor 610, embedded memory 615, and a network connection 620. The embedded processor 610 interfaces with processor(s) 105 of IHS 100 via a power interconnect (not shown) and/or interconnect 115 (see FIG. 1).

According to one embodiment, memory 615 may include an Intelligent Platform Management Interface (IPMI) stack, a web server application, other OS applications, and firmware 625. The IPMI facilitates management calls to the IHS 100. The web server allows for remote system management through network connection 620. Firmware 625 includes executable code that enables the performance of many of the functional features described herein and illustrated by the flow charts. Within firmware 625 is poll frequency parameter 627, which provides a time interval between power controller 605 polling the PSU states to determine if the PSUs are in a redundant PSU configuration and/or to determine when a PSU is failing or access to the reserve power of a redundant PSU configuration is not available. As shown, in one embodiment, a redundancy sensor 635, under the control of power controller 605 intermittently polls a PSU configuration module 640 that tracks a current configuration state of the PSUs within the power source 660. As shown, power source 660 includes a first PSU1 450A and a second PSU2 450B. Additionally, power source 660 includes UPS 662 and internal backup battery 664, one or both of which operates as a backup power supply in the event one or both of the PSUs 450 fail or are removed from the system. In one embodiment, one or both of UPS 662 and battery 664 can be utilized to provide support for an enhanced operating state, while one of the PSUs 450 is failing or is generating less than the required additional power to support the power transients generated during the enhanced mode. Power source 660 is connected via a power distribution system of wires to other components of the IHS 100.

In an exemplary embodiment, each PSU 450 will warn the IHS 100 and specifically the power controller 605 of an impending PSU shutdown. Upon being notified, the IHS 100 will invoke throttling mechanisms to reduce power consumption or heat dissipation. In one embodiment, while the system is being throttled, the power controller 605 triggers the reconfiguration of the CPU subsystem to prevent the system processor(s) from operating in the enhanced processing mode, thus preventing peak power transients from occurring during the system a throttling period.

According to the illustrative embodiment, the power controller 605 implements a redundancy sensor 635 which tracks when the more than one PSU in a system is to be set in and/or is currently set in a redundant configuration. For example, when the sensor is set to "Input Power Redundant," if the system has two PSUs installed therein, the two PSUs will be set in a 1+1 redundant configuration. Alternatively, four PSUs can be set in a 2+2 redundant configuration and so on. The power budget for the system will be calculated using the limits of only one PSU. When the redundancy sensor is set to "Not Redundant," then the PSUs will be set in a 2+0 or 4+0 configuration and so on, and the power budget for the system will be calculated using the combined limits of the PSUs. If the PSUs are not in a redundant configuration, then CPU power budget must include maximum CPU power including max sustained power (TDP), and transients from operating in an enhanced processing mode. If, on the other hand, the PSUs are in a redundant configuration, then CPU power budget needs only include CPU TDP. For ease of understanding, only two PSUs will be used throughout the rest of the disclosure. Thus, a redundant configuration will be denoted as 1+1 and a non-redundant configuration as 1+0 or 2+0.

In one embodiment, the power controller 605 polls the PSUs 450 every pre-set time interval (e.g., 1 second) to determine whether a PSU has been added or removed. A PSU in a fail state will not respond to the poll and will be classified as being removed. At any time, a user may change the state of the redundancy sensor from redundant to non-redundant and vice versa. Consequently, the power controller 605 can also poll the redundancy sensor 635 every pre-set time interval (e.g., every 2.5 seconds) to determine the state of the redundancy sensor 635. When the redundancy sensor 635 is set to redundant and a PSU has been removed, the power controller 605 changes the processor performance state to prevent the processor from entering enhanced processing mode. Alternatively, in the scenario where one of the backup battery 664 or UPS 662 is available or where the PSU has simply stopped producing its regular output of power but is still providing a portion of the rated power, the power controller 605 can limit the processor performance state rather than simply preventing all operation in the enhanced processing mode. For example, in one embodiment, the power controller 605 can computer the amount of power that is available and limit the enhanced state only so much as to prevent the power consumption to exceed the available reserve power. If a PSU that had been removed is added back to a redundant configuration, then the power controller 605 changes back the processor performance state to allow the processor to enter enhanced processing mode.

Figure 7:
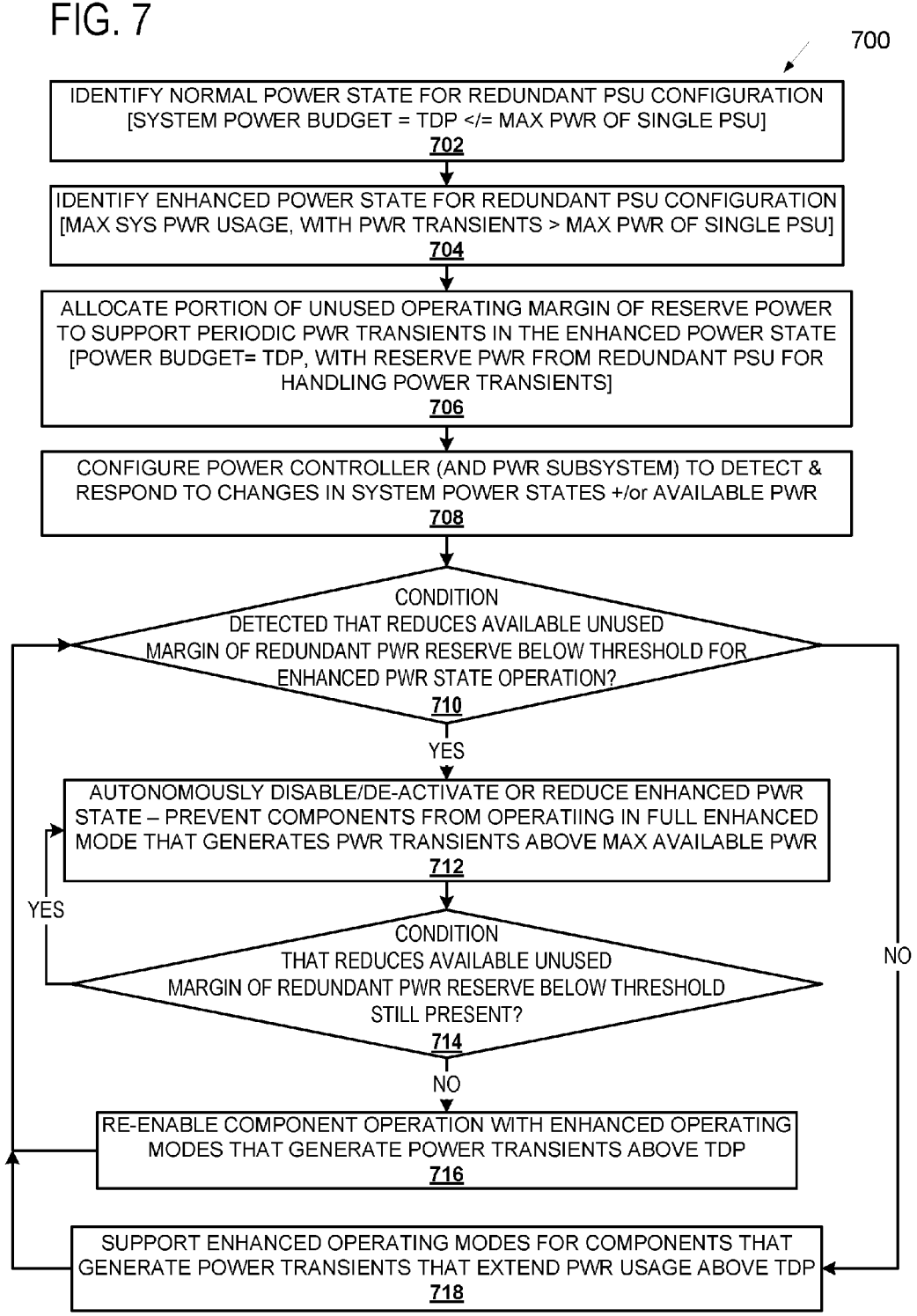
FIGS. 7 and 8 are flowcharts of different embodiments of methods by which a power controller controls power allocation by enabling and disabling an enhanced power state that generates power transients in an IHS powered by a redundant PSU configuration.
Figure 8:
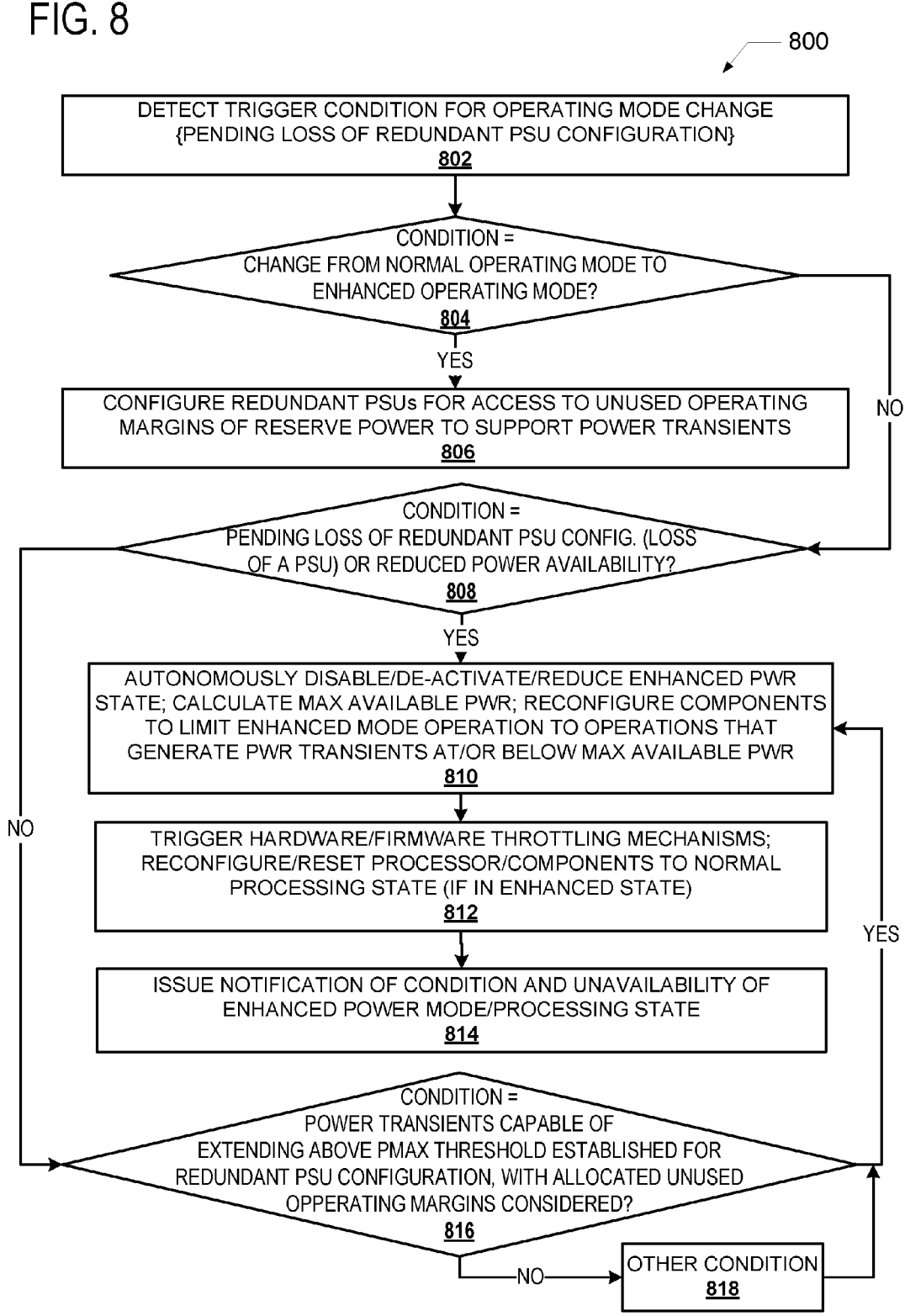

The flow charts of FIGS. 7 and 8 present two methods by which the power controller 605 can control power resource allocation and prevent system shutdown in the event of specific conditions that reduce the availability of the power margins of the redundant PSU configuration. Method 700 begins at block 702 at which power controller 605 is configured to control power allocation to components within the system by first identifying a sustained power state in which the system is powered by a redundant PSU configuration comprising a first PSU and a second PSU, which are both rated to independently support a thermal design power (TDP) of the information handling system during normal operation. The maximum amount of power utilized by the system during the sustained power state is not greater than an amount of power provided by a single one of the PSUs, and the redundant PSU configuration thus provides an unused operating margin of backup reserve power. Method 700 further includes the power controller 605 being further configured to control power allocation by: identifying an enhanced power state during which a maximum power required by the information handling system is greater than the amount of power provided by the single or primary PSU (block 704); and allocating a portion of the unused operating margin of backup reserve power to support intermittent power transients that can occur during system operation in the enhanced power state (block 706). Method 700 also includes configuring the power controller 605 and the power subsystem 600 to detect and respond to changes in the system's power states and available power resources (block 708). At decision block 710, method 700 includes a determination of whether a condition is detected that reduces the available unused margin of redundant power reserve below a threshold margin required for enhanced power state operation. In response to a detection of a condition that reduces an amount of unused operating margin of backup reserve power to less than an amount of additional power required to support the intermittent power transients of operations in the enhanced power state, method 700 includes autonomously disabling and/or de-activating or limiting the enhanced power state to prevent an occurrence of the intermittent power transients (block 712). As presented herein, limiting the enhanced power state involves allowing some operations in the enhanced state that can generate partial power transients above the TDP but below the max power consumed by the system's operation in full enhanced operating state, as further described in FIG. 8. Following, method 700 includes determining at decision block 714 whether the detected condition that reduced the available unused margin to below the threshold is still present. If the condition is still present, the controller continues to reduce or deactivate the enhanced power state. In response to the condition no longer being present, method 700 includes re-enabling the enhanced operating modes of the components that can generate the power transients (block 716). Also, at decision block 710, when no condition is detected that affects the operation of the components in the enhanced operating modes, method 700 includes supporting the enhanced operating modes for those components, with the resulting power transients handled by the unused operating margins of the redundant PSU configuration (block 718).

In one or more embodiments, the information handling system comprises a processor that is capable of operating for a fixed period of time in an enhanced processor mode in which the processor operates at a higher than normal frequency and consumes more power than consumed during normal processor operation, where the enhanced processor mode correlates to the enhanced power mode and causes the power transients. Also, the enhanced processor mode comprises the processor operating within a dynamic power range that is larger than a thermal design power (TDP) of the processor and requiring additional amounts of power to support power transients above the maximum amount of power provided by a single one of the PSUs within the redundant PSU configuration.

FIG. 8 which presents a series of conditions that can affect the power consumption of the system and the manner in which the power controller 605 responds to each of these conditions. Method 800 is initiated with power controller 605 monitoring for an occurrence of a trigger condition. In one or more embodiments, the trigger condition can be one or more of: (i) detecting a PSU fault condition in which the reserve backup power is no longer available, (ii) detecting a failure of at least one PSU of the redundant PSU configuration, (iii) detecting a pending PSU shutdown, (iv) detecting a removal of one PSU from the system, and (v) detecting an increase in the amount of power transients generated above a pre-set threshold of usable reserve backup power, during operation in the enhanced processor mode. At block 802, method 800 includes detecting a trigger condition for at least one of the above listed trigger conditions. Then method 800 invokes a plurality of determinations (represented by decision blocks 804, 808, and 816), which may be completed concurrently or in parallel with each other but in a different sequence, in one or more embodiments. In response to detecting the trigger condition, method 800 generally includes: asserting re-active hardware and software throttling mechanisms to reduce the system power consumption (block 812); and disabling or limiting access to an enhanced processor mode responsible for the power transients in order to prevent the processor-triggered power transients from occurring (block 810). In one or more of the described embodiments, the system power consumption extends only up to the TDP value while the enhanced processor mode is disabled.

Referring specifically to the figure, at decision block 804, method 800 determines whether the detected trigger condition was detecting a change in system operation from a normal mode to an enhanced mode that respectively correlates to the sustained power mode and the enhanced power mode. In response to detecting the change, method 800 includes automatically configuring the redundant PSU configuration to provide access to the unused operating margins of the reserve backup power in order to support the power transients that can be generated during system operation in the enhanced mode, where the power transients includes intermittent spikes in overall system power consumption (block 806). At decision block 808, method 800 determines whether the trigger condition involves detecting a pending loss of the redundant PSU configuration which results in only one PSU being available or detecting a reduction in the overall amount of power available to the system due to one or more other conditions that affect the availability of power. In one embodiment, this detecting can include detecting a pending PSU shutdown. And, in response to detecting the pending shutdown or loss of the redundant PSU configuration or reduction in the overall power available, method 800 includes: disabling or limiting access to the enhanced processing state of the processor/components until the redundant PSU configuration is restored (block 810); triggering hardware and/or firmware throttling mechanism; and setting the processor operating mode to the normal processing state (block 812). Method 800 further includes issuing a notification of the unavailability of the enhanced processor/component operating mode (block 814).

According to one embodiment, method 800 includes reducing access to an enhanced processor mode responsible for the power transients in order to prevent processor-triggered power transients from occurring, wherein reducing access to the enhanced power mode ranges from: (i) allowing some access that is scaled to correlate to an amount of total power consumption that is not more than an available amount of power, to (ii) disabling access completely, and wherein the system power consumption extends only up to the TDP value while the enhanced processor mode is disabled.

According to one embodiment, autonomously limiting access to the enhanced power state further includes: detecting a pending reduction of maximum power available to the system; calculating a maximum power that will be available following the detected pending reduction; and reconfiguring an operating state of the components of the system that generate the power transients to prevent any operation that increases the amount of required power to above the maximum power. It is appreciated that in the context of the calculations and subsequent adjustment to limit the enhanced power/operating state, the controller can reduce the power transients down to the PSU limit (e.g., PMax) rather than to the lower TDP. Also, in one or more embodiments, a pre-established data structure can be maintained by the controller that maps different levels of enhanced operating states to available power margins above the normal amount of power consumed when the system is operating in the normal state. Graduated levels of enhanced operation can thus be supported based on the available power to support the maximum power consumption at each respective level of enhanced operations.

Also, in one embodiment, detecting the pending reduction can include: detecting a pending loss of power capacity associated with the redundant PSU configuration which results in only full capacity of one PSU being available; and in response to detecting the pending loss, while the processor is in the enhanced processing state, resetting the processor to the normal processing state. Further, calculating a maximum power that will be available comprises adding a first power rating of any remaining PSU(s) with a second power rating of any backup power device provided within the system to generate a maximum power value, where the backup power device can be one or more of a battery backup and a universal power supply (UPS). Also, in one or more embodiments, reconfiguring the operating state of the components comprises limiting processor operation in the enhanced processing state of the processor until the redundant PSU configuration is restored.

One aspect of method 800 can include: reconfiguring one or more components that trigger the power transients when in an enhanced operating mode to only operate in one of: (i) a normal operating mode, and (ii) a limited or reduced enhanced operation mode to prevent an occurrence of peak power transients that are not within the normal TDP budget. Also, at decision block 816 method 800 can include determining whether the condition is an indication that the power transients can cause the power consumption to exceed the available power even with the margins of unused reserved power available in the redundant PSU configuration. In response to this detected event being the trigger condition, method 800 also performs the sequence of processes laid out in blocks 810-812-814. In the event that the trigger condition is a different condition 818 from the aforementioned conditions, method 800 includes performing one or more of the sequence of processes laid out in blocks 810-812-814.

The above described fault tolerant designs of power subsystems allows for minimal performance impact during a fault condition by disabling performance features or statically limiting maximum performance level in response to changes in the PSU redundancy status. Limiting maximum performance capability to prevent maximum CPU power transients is a graceful mechanism to deliver most of the system performance during a fault condition when reactive hardware or firmware throttling are unable to control peak power transients.

Figure 9:
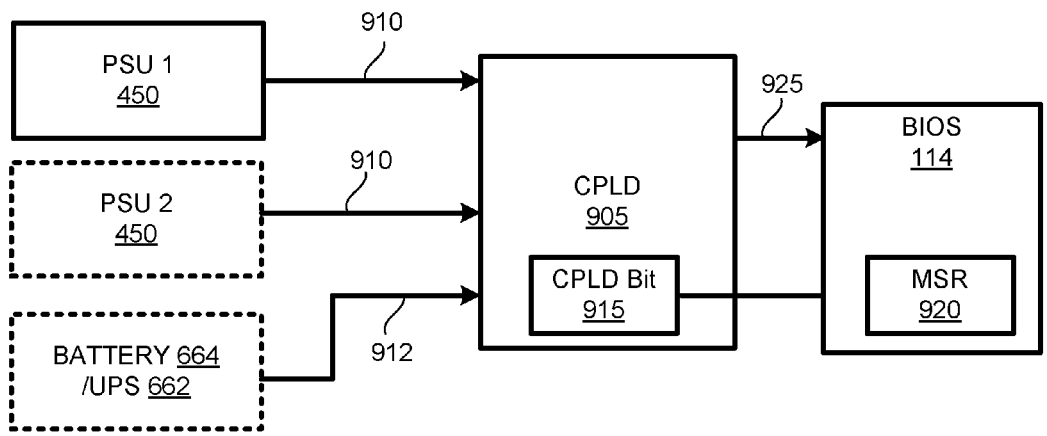
FIG. 9 depicts a complex programmable logic device (CPLD) monitoring operational states of two PSUs, in accordance with one or more embodiments.
Figure 10:
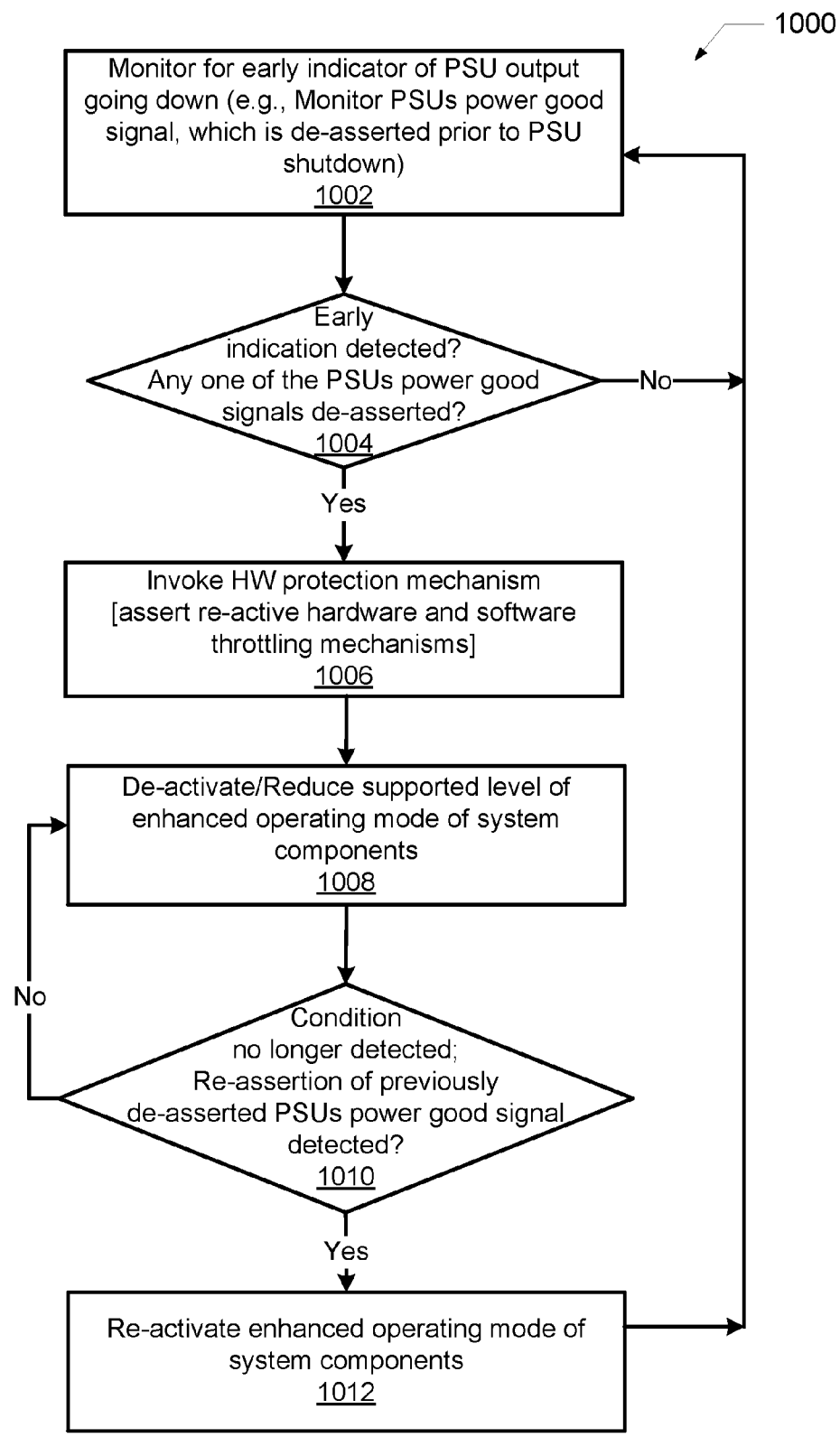
FIG. 10 is a flow chart of a method that provides a specific implementation by which a condition affecting availability of the redundant PSU configuration is detected and responded to by the system, according to one embodiment.

In one embodiment, as illustrated by FIG. 9, the monitoring of the PSUs is performed by a complex programmable logic device (CPLD). FIG. 9 depicts a CPLD 905 monitoring operational states of two PSUs 450, as well as an internal battery 664 or UPS 662, shown collectively within a single box. It is appreciated that the system can include any two or more of the above units set in a redundant configuration. Thus, the references herein to a redundant PSU configuration can also be extended to include a configuration that includes a single or primary PSU and internal battery 664 or single or primary PSU and UPS 662, for example, without limitation. The CPLD 905 is used to monitor the PSUs and other backup power components and to take corrective actions, such as throttling the system, when one of the PSUs is about to enter into a fail state. The power controller 605 is then utilized to dynamically re-configure the CPU subsystem to limit, throttle, or prevent the enhanced processing operations. The PSUs 450 each have a "power good" signal 910 that indicates when all outputs are within specifications. The backup power supply (662/664) also has a backup power good signal 912 that informs the CPLD 905 of the availability of the backup power in the event of a loss in the main power from one or both of the PSUs 450. The "power good" signal 910 of a PSU 160 will be de-asserted at least 1 ms before the PSU 160 enters into a fail state. The signal will be de-asserted when any one of the following is about to occur: (1) the cooling system of the PSU is non-operational (i.e., fan failure), (2) the PSU is operating at a temperature that exceeds the PSU designed thermal envelope. It is appreciated that if the PSU loses AC main power or the PSU is removed, the signal will not be asserted. The CPLD 905 monitors the "power good" signal 910 of each PSU 450 that is installed in the IHS 100 to determine whether or not the "power good" signal 910 is de-asserted. Once the CPLD 905 determines that the "power good" signal 910 of a PSU 450 is de-asserted, the CPLD 905 invokes hardware protection mechanisms to reduce power consumption. The descriptions of FIGS. 9 and 10 provides a specific implementation that relies on the power good signal 910 as the mechanism for providing an early determination or indicator of the power output of one or more of the PSU(s) going down. However, other mechanisms are possible and supported within the scope of the disclosure, and the presentation herein is solely to provide one embodiment of a practical implementation, without limitation.

FIG. 10 is a flowchart of a process that may be used by the CPLD 905 to monitor the PSUs 450 for impending failure. The process starts when the IHS 100 is turned on. Once the process starts, the CPLD 905 continually monitors the "power good" signal of the installed PSUs 450 to detect when or whether the signal is de-asserted (block 1002). As noted above, the "power good" signal of a PSU will be de-asserted 1 ms before the PSU enters into a fail state. Thus, the "power good" signal is one possible early indicator of a pending loss of full power capacity from the PSUs 450. In one embodiment, the method 1000 can include automatically de-asserting a "power good" signal prior to a shutdown of the PSU. If, as determined at decision block 1004, neither of the "power good" signals of the PSUs 450 is de-asserted, the process returns to block 1002. If the "power good" signal of at least one of the PSUs is de-asserted, the CPLD 905 invokes hardware protection mechanisms (block 1006) to reduce power consumption.

Method 1000 further includes performing one of: (a) de-activating and (b) limiting the enhanced operating mode of system component in response to detecting the de-assertion of the "power good" signal in order to respectively eliminate or reduce a magnitude of the power transients generated by operation in the enhanced processing state (block 1008). According to the illustrated embodiment, the method 1000 also includes: detecting a later re-assertion of the "power good" signal (decision block 1010); And in response to detecting re-assertion of the "power good" signal, which indicates that restoration of the redundant PSU configuration has occurred (decision block 1010), method 1000 further includes re-activating the full enhanced operating mode in response to detecting the re-assertion of the power good signal (block 1012). Otherwise, method 1000 returns to block 1008 where the enhanced operating mode continues to be limited, reduced or deactivated.

Figure 11:
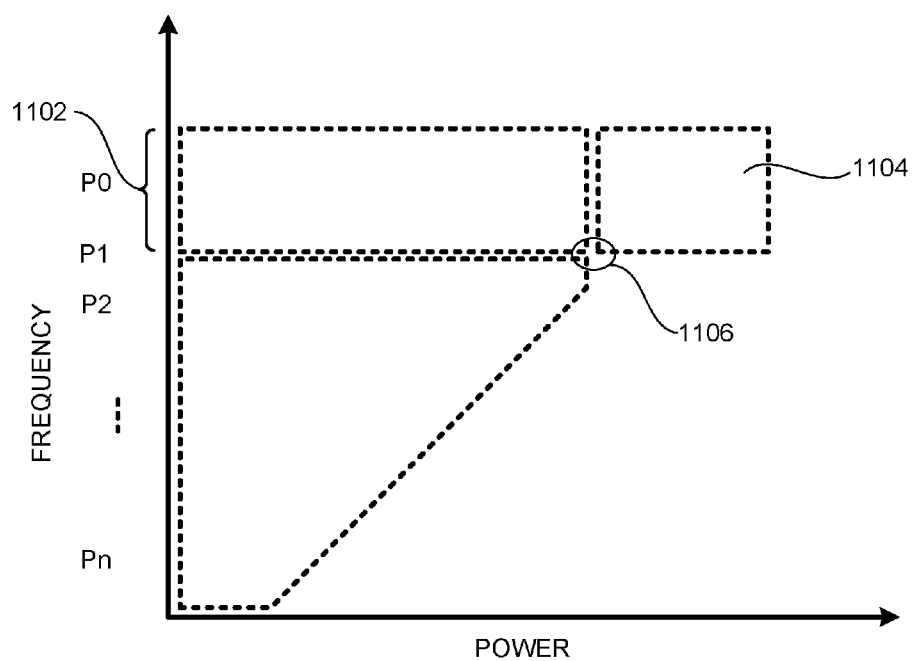
FIG. 11 depicts a graph illustrating different performance states of a processor with enhanced processing capabilities, according to one embodiment.

FIG. 11 depicts a graph illustrating the different P-states of a processor with enhanced operating states that causes the CPU or other component of the IHS 100 to consume more power than the TDP rating of that device. In the figure, average processor power consumption along an x-axis is plotted against operating frequencies, expressed in P-states, along a y-axis. According to the figure, when the processor is set to operate in P1 state, the processor consumes the most power at TDP 1106. When the processor is set to operate in P0 state, the processor will be operating in P0 range 1102. When in the P0 range 1102, the processor may enter enhanced processing region 1104 if and only if the enhanced processing feature is enabled. The enhanced processing feature can be enabled or disabled during Power-On-Self-Test (POST) which is handled by BIOS 114 (FIGS. 1 and 9). If the enhanced processing feature is enabled, the processor will enter the enhanced processing region 1104 whenever needed.

Thus, in order for the processor to enter enhanced processing mode during run-time, the enhanced processing feature must have already been enabled by BIOS 114. Provided that the enhanced processing feature is enabled, when a PSU is removed, the power controller 605 will change the processor maximum P-state from P0 to P1 to prevent the processor from entering enhanced processing mode. When a PSU that had been removed is replaced, the power controller 605 will change the maximum performance state from P1 to P0 to allow the processor to enter enhanced processing mode when needed.

In one embodiment, utilizing the illustration of FIG. 9, to change the P-state of the processor to P1, the power controller 605 can set a CPLD bit 915. After setting the CPLD bit 915, the power controller 605 can send a system management interrupt (SMI) or SCSI call 925 to BIOS 114 (FIG. 1). Once BIOS 114 receives the SCSI call (925), BIOS 114 will check the status of the CPLD bit 915 and will set model specific register (MSR) 920 to limit the max P-state to P1. To change the P-state of the processor to P0, the power controller 605 can de-assert the CPLD bit 915 and send an SMI or SCSI call 925 to BIOS 114. Once BIOS 114 determines that the bit is de-asserted, BIOS 114 will set the MSR 920 to limit the max P-state to P0.

Figure 12:
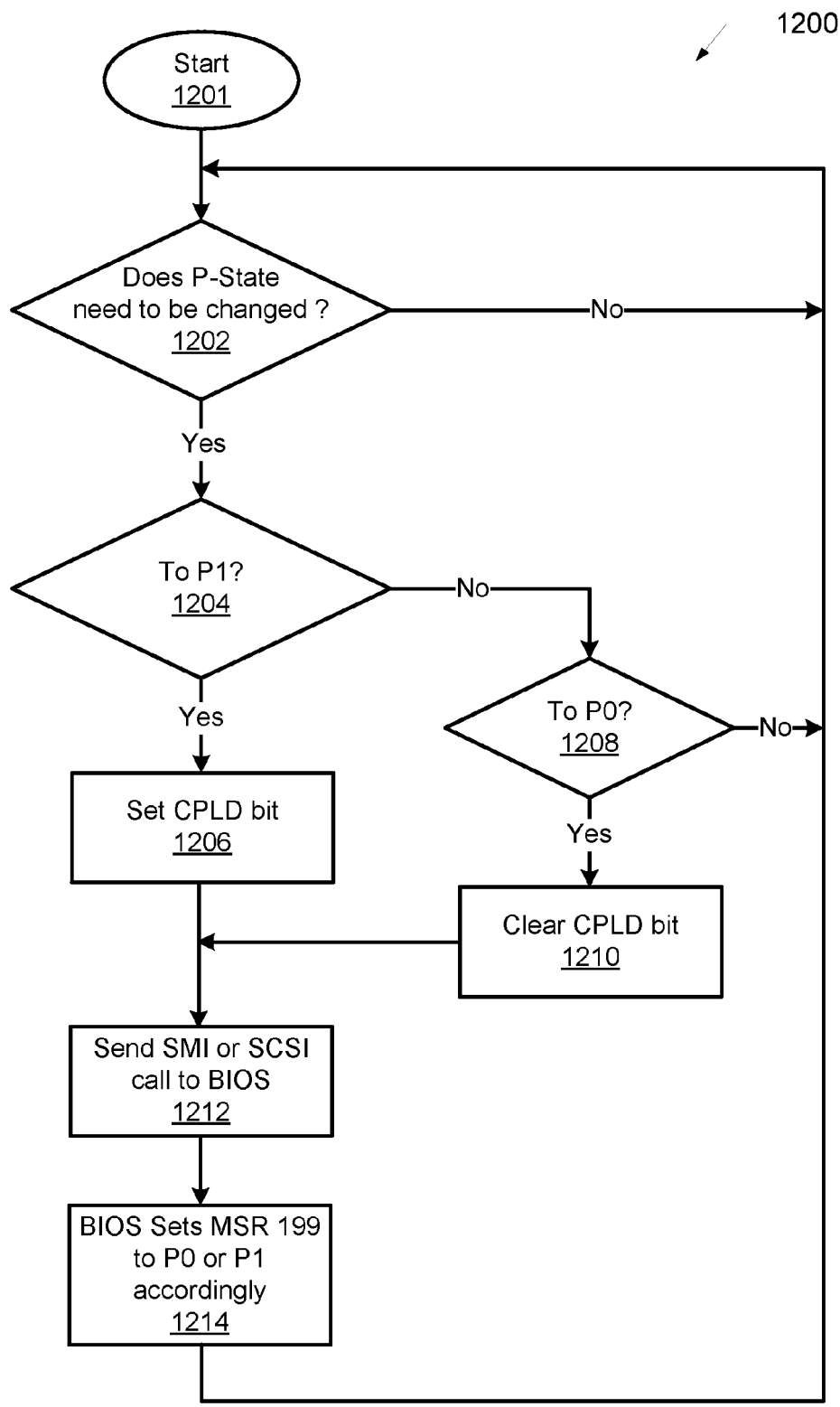
FIG. 12 is a flow chart of a method that provides a specific implementation of triggering the de-activation on an enhanced operating mode using the hardware subsystem of FIG. 9, in accordance with one embodiment.

FIG. 12 is a flow chart of a method process 1200 that may be used by the power controller 605 to change the performance state of a processor from P0 to P1 and vice versa. While the figure provides an illustration of power allocation and control based on different processor performance states, this use of processor states is solely for illustration and represents one possible implementation. The presented example is a single embodiment and is not intended to and does not limit the scope of the disclosure. The process starts when the system is turned on (start block 1201). Once the process starts, the power controller 605 continually checks to determine whether the P-state of the processor needs to be changed (decision block 1202). If the processor's P-state needs to be changed, then the power controller 605 performs another check to determine whether the P-state should be P1 (decision block 1204) or P0 (decision block 1208). If the P-state is to be P1, power controller 605 sets a CPLD bit 915 (block 1206) and sends an SMI or SCSI call 925 to the BIOS 114 (block 1212). If the P-state is to be P0, then the power controller 605 clears the CPLD bit (block 1210) and sends the SMI or SCSI call 925 to the BIOS 114 (block 1212). Upon receiving an SMI or SCI call 925, the BIOS 114 will check the CPLD bit 915 to see whether the bit is set or not, and BIOS 114 sets the MSR (199) 920 to max P0 or P1, accordingly (block 1214), before the process returns to block 1202.

As described herein, one aspect of the disclosure provides an information handling system that includes: multiple power supply units (PSUs), including a first PSU and a second PSU; one or more functional components including a processor that executes program instructions; and a power controller communicatively coupled to the multiple PSUs and to the processor and which controls power allocation to the one or more functional components within the system. The power controller includes firmware that causes the controller to perform or trigger the performance by other components of the above presented functions and processes of the various flow charts.

The processes disclosed above may be in the form of a computer program product accessible from a computer-usable or computer-readable device providing program code for use by or in connection with a computer or any other instruction execution system. For the purposes of this description, a computer-usable or computer readable device can be any tangible apparatus that can contain, store, communicate, propagate, or transport the program for use by, or in connection with, the instruction execution system or device.

The medium can be an electronic, magnetic, optical, electromagnetic, infrared, or semiconductor system or device or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) Digital Video/Versatile Disk (DVD) etc.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implementable method of budgeting power allocation for an information handling system, the computer-implementable method comprising:
    in response to determining that the information handling system is to be powered by a redundant configuration of multiple PSUs including a primary PSU and a secondary PSU, calculating a power budget, based on discovery of installed system components, of a first amount of power for the system that is less than a maximum power that can be consumed by the system and configuring the system to autonomously utilize unused operating margin of the redundant configuration of the PSUs during periods in which the system requires greater than the first amount of power;
    wherein the first amount of power is a thermal design power (TDP) of the system that does not exceed the output of the primary PSU within the redundant configuration, wherein power transients are removed from direct consideration during PSU right sizing for the system when the information handling system is to be powered by a redundant PSU configuration; and
    in response to determining that the information handling system is not to be, or is no longer being, powered by a redundant configuration of multiple PSUs, calculating a power budget, based on discovery of installed system components, of a second amount of power for the system that is at least equal to the maximum power that can be consumed by the system, and which does not exceed the output of the primary PSU.

2. The computer-implementable method of claim 1, wherein:
    the second amount of power is at least equal to a highest value of power required to support a power envelope which includes power transients that can occur in the system and which is greater than the TDP of the system, wherein a maximum value of the power transients are included in a calculation for PSU right sizing during power budgeting for the system when the information handling system is to be powered by the primary PSU.

3. The computer-implementable method of claim 1, wherein:
    budgeting the first amount of power comprises: determining a first sum of power consumed by all components within the system when operating in a sustained power consumption state; comparing the first sum of power to a maximum power output of the primary PSU; assigning the first sum of power as the budgeted first amount of power in response to the first sum of power being less than the power output of the primary PSU; and
    budgeting the second amount of power comprises: determining a second maximum amount of power consumed by all components when operating in an enhanced power consumption state, wherein the enhanced power consumption state involves greater overall power consumption than the sustained power consumption state due to power transients; and setting the second amount of power budget to the second maximum amount of power.

4. The computer-implementable method of claim 3, wherein determining the first total amount of power comprises:
    adding each individual amount of power consumable by each hardware component during normal operation of the hardware components within the system to generate a first total amount of power;

determining the second maximum amount of power comprises:

identifying which components are capable of intermittently operating in enhanced operating states in which the component consumes additional amounts of power above a sustained consumption for the particular component, where the additional amounts of power yield detectable power transients;

adding together each of the detectable power transients for all components in the system to yield a total power transient; and adding the total power transient to the first total amount of power to yield the second maximum amount of power.

5. The computer-implementable method of claim 1, wherein:

at least one component of the system intermittently consumes additional amounts of power above a sustained power consumption for that component to intermittently generate power transients above a thermal design power (TDP) of the system;

said second amount of power comprises a power allocation that is sufficient to support periods in which the power transients are generated within the system; and a non-transient portion of the second amount of power is provided by the primary PSU, and the power transients are supported by one or more of additional power capacity provided within the primary PSU, power capacity of an internal battery backup, and power capacity of a universal power supply.

6. The computer-implementable method of claim 1, wherein, while the information handling system is being powered by the redundant configuration of two or more PSUs with the first amount of power budgeted for the system, the method further comprises:

monitoring system power usage within the information handling system;

detecting when at least one component is operating in a state that generates power transients, which causes the system to consume greater than the first amount of power budgeted; and in response to a total amount of current system power required being above the first amount of power budgeted, automatically allocating unused operating margins of reserve power from the redundant configuration of the PSUs in order to support system operation within a power envelope that accounts for the power transients.

7. The computer-implementable method of claim 6, wherein the at least one component includes a central processing unit (CPU), which operates in one of (a) a first CPU state in which the processor consumes a first amount of CPU power that is supported within a power envelope corresponding to the first amount of system power and (b) a second enhanced CPU state in which the processor consumes a second amount of CPU power that requires a larger power envelope corresponding to the second amount of system power.

8. An information handling system for budgeting power allocation, the information handling system comprising:

at least one processor that executes program code; and a power controller communicatively coupled to the at least one processor and to other components within the information handling system and which includes firmware that executes on a microprocessor of the power controller to configure the power controller to:

in response to determining that the information handling system is to be powered by a redundant configuration of two or more PSUs including a primary PSU and a secondary PSU, budget a first amount of power for the system that is less than a maximum power that can be utilized by the system and configure the system to autonomously utilize unused operating margins of reserve power from the redundant configuration of the PSUs during periods in which the system requires greater than the first amount of power;

wherein the first amount of power is a thermal design power (TDP) of the system that does not exceed the output of the primary PSU, wherein the power transients are removed from direct consideration during PSU right sizing for the system when the information handling system is to be powered by a redundant PSU configuration; and in response to determining that the information handling system is not to be, or is no longer being, powered by a redundant configuration of two or more PSUs, budget a second amount of power for the system that is at least equal to the maximum power that can be utilized by the system, and which does not exceed the output of the primary PSU.

9. The information handling system of claim 8, wherein:

at least one component of the system intermittently consumes additional amounts of power above a sustained power consumption for that component to intermittently generate power transients above a thermal design power (TDP) of the system;

said second amount of power comprises a power allocation that is sufficient to support periods in which the power transients are generated within the system; and the second amount of power is at least equal to a highest value of power required to support power transients that can occur in the system during operation and which is above the TDP of the system, wherein maximum value of the power transients is included in a calculation for PSU right sizing during power budgeting for the system when the information handling system is to be powered by the primary PSU or otherwise non-redundant PSU configuration; and the at least one component consumes a first amount of component power during normal operations and intermittently consumes a second, greater amount of component power during high usage periods.

10. The information handling system of claim 9, wherein the at least one component includes a central processing unit (CPU), which operates in one of (a) a first CPU state in which the processor consumes a first amount of CPU power that is supported within a power envelope corresponding to the first amount of system power and (b) a second CPU state in which the processor consumes a second amount of CPU power that requires a larger power envelope corresponding to the second amount of system power.

11. The information handling system of claim 8, wherein:

the firmware that configures the power controller to budget the first amount of power comprises firmware that configures the power controller to: determine a first sum of power consumed by all components within the system when operating in a sustained power consumption state; compare the first sum of power to a maximum power output of a primary PSU; assign the first sum of power as the budgeted first amount of power in response to the first sum of power being less than the power output of primary PSU;

the firmware that configures the power controller to budget the second amount of power comprises firmware that configures the power controller to: determining a second maximum amount of power consumed by all components when operating in an enhanced power consumption state, wherein the enhanced power consumption state involves greater overall power consumption than the sustained power consumption state due to power transients; and set the second amount of power budget to the second maximum amount of power; and a non-transient portion of the second amount of power is provided by the primary PSU, and the power transients are supported by one or more of additional power capacity provided within the single or primary PSU, power capacity of an internal battery backup, and power capacity of a universal power supply.

12. The information handling system of claim 8, wherein:
the firmware that configures the power controller to determine the first total amount of power comprises firmware that configures the power controller to add each individual amount of power consumable by each hardware component during sustained operation of the hardware components within the system to generate the first total amount of power; and the firmware that configures the power controller to determine the second maximum amount of power comprises firmware that configures the power controller to:
identify which components are capable of operating in enhanced operating states in which the component consumes additional amounts of power above a sustained consumption for the particular component, where the additional amounts of power yield detectable power transients;
add together each of the detectable power transients for all components in the system to yield a total power transient; and
add the total power transient to the first total amount of power to yield the second maximum amount of power.

13. The information handling system of claim 8, wherein, while the information handling system is being powered by the redundant configuration of two or more PSUs with the first amount of power budgeted for the system, the firmware further configures the power controller to:
monitor system power usage within the information handling system;
detect when at least one component is operating in a state that generates power transients, which causes the system to consume greater than the first amount of power budgeted; and
in response to a total amount of current system power required being above the first amount of power budgeted, automatically allocate unused operating margins of reserve power from at least one of the redundant configuration of the PSUs and available backup reserve power from among a UPS and a backup battery in order to support system operation within a power envelope that accounts for the power transients.

14. The information handling system of claim 8, wherein:
the primary PSU includes N PSUs where N is an integer number greater than or equal to 1, and the N PSUs that comprise the primary PSU collectively provide the power necessary to support the IHS;
a secondary PSU of the redundant PSU configuration includes M PSUs that operate as backup PSUs to the primary PSU and which collectively provide additional redundant power capacity; and
the redundant configuration of PSUs comprises N primary PSUs and M secondary PSUs in an N+M configuration.

15. A non-transitory machine-readable storage device embodying machine-executable instructions configured for:
determining whether an information handling system is to be powered by a redundant configuration of multiple power supply units (PSUs) including a primary PSU and a secondary PSU;
in response to determining that the information handling system is to be powered by a redundant configuration of multiple PSUs, budgeting a first amount of power for the system that is less than a maximum power that can be utilized by the system and configuring the system to autonomously utilize unused operating margins of reserve power from the redundant configuration of the PSUs during periods in which the system requires greater than the first amount of power;
wherein the first amount of power is a thermal design power (TDP) of the system that does not exceed the output of the primary PSU, wherein the power transients are removed from direct consideration during PSU right sizing for the system when the information handling system is to be powered by a redundant PSU configuration; and
in response to determining that the information handling system is to be powered by a non-redundant configuration of multiple PSUs, budgeting a second amount of power for the system that is at least equal to the maximum power that can be utilized by the system, and which does not exceed the output of the primary PSU.

16. The non-transitory machine-readable storage device of claim 15, wherein:
at least one component consumes a first amount of component power during normal operations and intermittently consumes a second, greater amount of component power during high usage periods to intermittently generate power transients above a thermal design power (TDP) of the system;
said second amount of power comprises a power allocation that is sufficient to support periods in which the power transients are generated within the system; and
the second amount of power is at least equal to a highest value of power required to support power transients that can occur in the system during operation and which is above the TDP of the system, wherein maximum value of the power transients is included in a calculation for PSU right sizing during power budgeting for the system when the information handling system is to be powered by a primary PSU.

17. The non-transitory machine-readable storage device of claim 15, wherein:
the machine executable instructions for budgeting the first amount of power comprises instructions for: determining a first sum of power consumed by all components within the system when operating in a sustained power consumption state; comparing the first sum of power to a maximum power output of a primary PSU; assigning the first sum of power as the budgeted first amount of power in response to the first sum of power being less than the power output of the primary PSU;
the machine executable instructions for budgeting the second amount of power comprises instructions for: determining a second maximum amount of power consumed by all components when operating in an enhanced power consumption state, wherein the enhanced power consumption state involves greater overall power consumption than the sustained power consumption state due to power transients; and setting the second amount of power budget to the second maximum amount of power; and a non-transient portion of the second amount of power is provided by the primary PSU, and the power transients are supported by one or more of additional power capacity provided within the primary PSU, power capacity of an internal battery backup, and power capacity of a universal power supply.

18. The non-transitory machine-readable storage device of claim 17, wherein:

the machine executable instructions for determining the first total amount of power comprises instructions for adding each individual amount of power consumable by each hardware component during normal operation of the hardware components within the system to generate the first total amount of power; and the machine executable instructions for determining the second maximum amount of power comprises instructions for:

identifying which components are capable of operating in enhanced operating states in which the component consumes additional amounts of power above a normal consumption for the particular component, where the additional amounts of power yield detectable power transients;

adding together each of the detectable power transients for all components in the system to yield a total power transient; and adding the total power transient to the first total amount of power to yield the second maximum amount of power.

19. The non-transitory machine-readable storage device of claim 15, wherein, while the information handling system is being powered by the redundant configuration of two or more PSUs with the first amount of power budgeted for the system, the machine-executable instructions are further configured for:

monitoring system power usage within the information handling system;

detecting when at least one component is operating in a state that generates power transients, which causes the system to consume greater than the first amount of power budgeted; and in response to a total amount of current system power required being above the first amount of power budgeted, automatically allocating reserve power from within the redundant configuration of the PSUs in order to support system operation within a power envelope that accounts for the power transients.

20. The non-transitory machine-readable storage device of claim 19, wherein the at least one component includes a central processing unit (CPU), which operates in one of (a) a first CPU state in which the processor consumes a first amount of CPU power that is supported within a power envelope corresponding to the first amount of system power and (b) a second CPU state in which the processor consumes a second amount of CPU power that requires a larger power envelope corresponding to the second amount of system power.

* * * * *